United States Patent
Dague et al.

(10) Patent No.: US 6,429,999 B1
(45) Date of Patent: Aug. 6, 2002

(54) PRE-ASSEMBLED VOICE COIL MAGNETIC ASSEMBLY AND ROTATABLE ATTACHMENT STRUCTURE/METHOD TO BASE PLATE FOR DISC DRIVE

(75) Inventors: Wallis A. Dague, Louisville; Frederick Mark Stefansky, Longmont, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/285,936

(22) Filed: Apr. 2, 1999

Related U.S. Application Data

(63) Continuation of application No. 08/622,925, filed on Mar. 27, 1996, now Pat. No. 5,956,213, which is a continuation of application No. 08/400,463, filed on Mar. 7, 1995, now abandoned, which is a continuation of application No. 08/110,539, filed on Aug. 23, 1993, now abandoned, which is a division of application No. 07/796,576, filed on Nov. 22, 1991, now abandoned, which is a continuation-in-part of application No. 07/549,283, filed on Jul. 6, 1990, now abandoned, which is a continuation-in-part of application No. 07/147,804, filed on Jan. 25, 1988, now Pat. No. 4,965,684.

(51) Int. Cl.⁷ .............................................. G11B 5/12
(52) U.S. Cl. ................................................ 360/97.01
(58) Field of Search ....................... 360/97.01, 98.01, 360/264.3, 264.7, 264.8, 264.9

(56) References Cited

U.S. PATENT DOCUMENTS

| | | |
|---|---|---|
| 4,331,991 A | 5/1982 | Morehouse et al. |
| 4,346,416 A * | 8/1982 | Riggle et al. ................ 360/106 |
| 4,481,543 A * | 11/1984 | Saito ............................ 386/78 |
| 4,639,863 A * | 1/1987 | Harrison et al. ............. 364/200 |
| 4,682,255 A | 7/1987 | Sleger et al. |

(List continued on next page.)

FOREIGN PATENT DOCUMENTS

| | | |
|---|---|---|
| EP | 0383551 A | 8/1990 |
| WO | WO 90/01767 | 2/1990 |
| WO | WO 90/05359 | 5/1990 |
| WO | WO 91/02349 | 2/1991 |

OTHER PUBLICATIONS

Conner Peripherals, Inc., Hopi Series Model CP–30100, Nov. 1989, pp. 1–2.

Conner Peripherals, Inc., CP–3200F Series, Nov. 1989, pp. 1–2.

*Primary Examiner*—William Klimowicz
(74) *Attorney, Agent, or Firm*—Merchant & Gould P.C.

(57) ABSTRACT

A disc drive and method of making a disc drive, including a voice coil magnet assembly. The voice coil magnet assembly includes a top magnetic return plate, a bottom magnetic return plate and at least one pair of magnets affixed to at least one of the plates. The voice coil magnet assembly is pre-assembled prior to attachment to a base plate. The pre-assembled voice coil magnet assembly is then structurally coupled to the base plate at a boss or attachment point, and is done so in a rotatable manner at the boss or attachment point, such that the voice coil of an actuator assembly is sandwiched by the rotation of the pre-assembled unit about the structural attachment point or boss.

17 Claims, 19 Drawing Sheets

U.S. PATENT DOCUMENTS

| | | | |
|---|---|---|---|
| 4,692,999 A | * 9/1987 | Frandsen | 29/596 |
| 4,712,146 A | 12/1987 | Moon et al. | |
| 4,725,904 A | 2/1988 | Dalziel | |
| 4,772,972 A | * 9/1988 | Maeda | 360/97.01 |
| 4,814,913 A | 3/1989 | Mihara et al. | |
| 4,890,174 A | 12/1989 | Chalmers et al. | |
| 4,933,785 A | 6/1990 | Morehouse et al. | |
| 4,965,684 A | * 10/1990 | Stefansky | 360/78.12 |
| 4,979,062 A | * 12/1990 | Stefansky et al. | 360/97.02 |
| 5,005,095 A | 4/1991 | Wagner | |
| 5,023,736 A | 6/1991 | Kelsic et al. | |
| 5,025,335 A | 6/1991 | Stefansky | |
| 5,025,336 A | 6/1991 | Morehouse et al. | |
| 5,060,100 A | 10/1991 | Mihara et al. | |
| 5,134,608 A | 7/1992 | Strickler et al. | |
| 5,170,300 A | 12/1992 | Stefansky | |
| 5,187,627 A | 2/1993 | Hidrox et al. | |
| 5,313,354 A | 5/1994 | Sampietro et al. | |
| 5,319,511 A | 6/1994 | Lin | |
| 5,329,412 A | 7/1994 | Stefansky | |
| 5,483,399 A | 1/1996 | Jeong et al. | |
| 5,568,333 A | 10/1996 | Bang | |

* cited by examiner

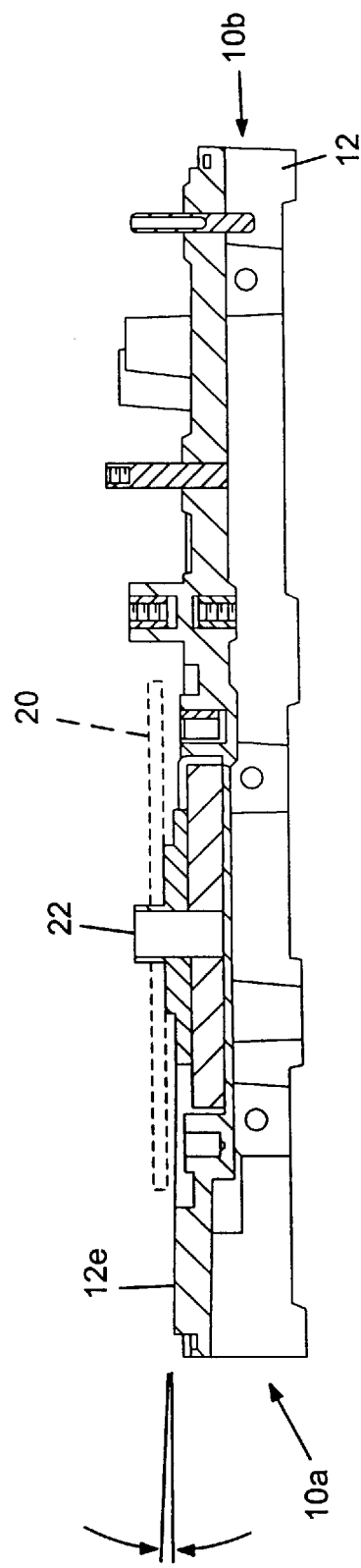
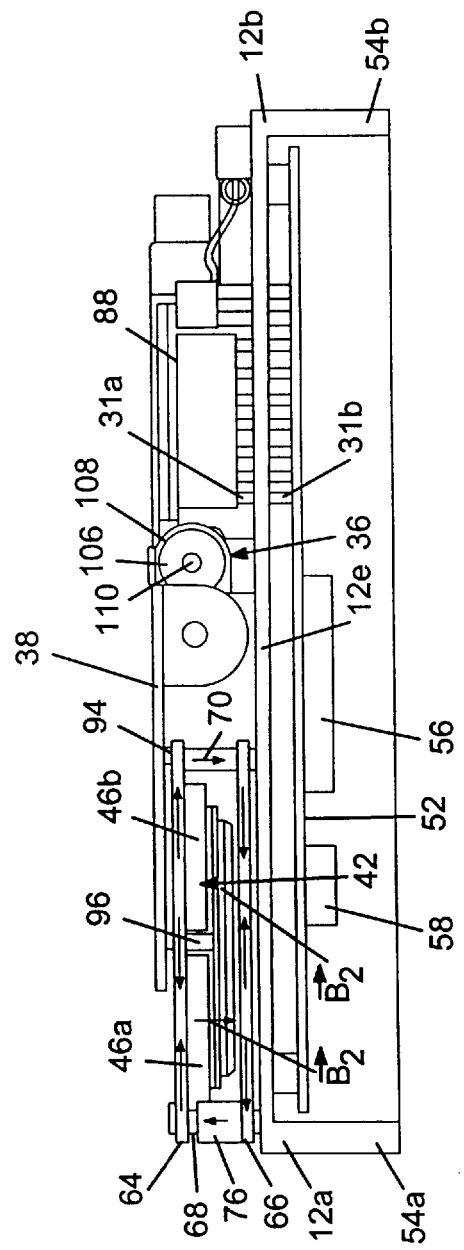

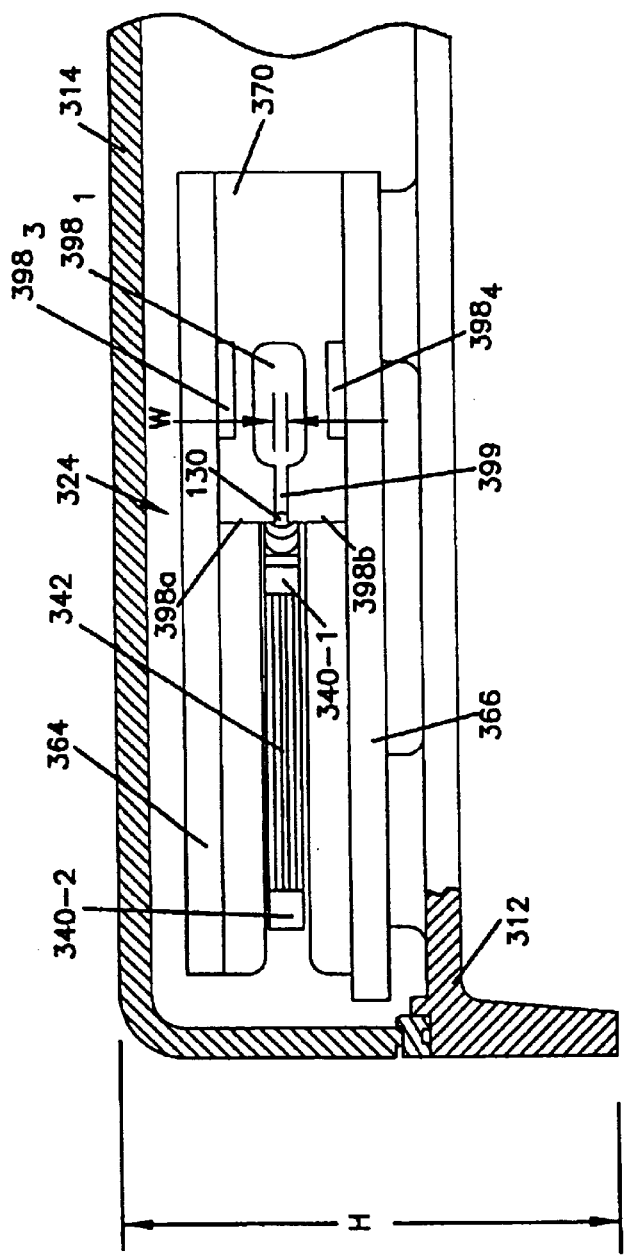
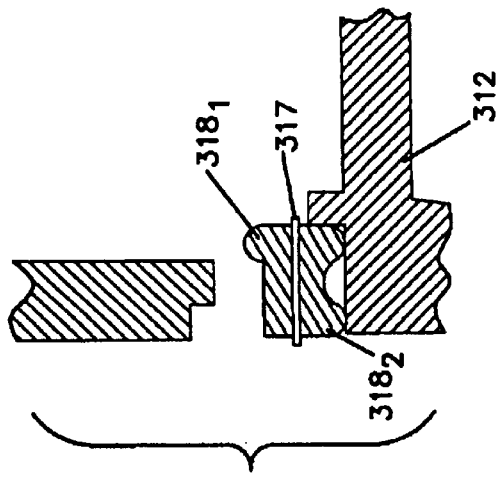
FIG.18
FIG.19

PRE-ASSEMBLED VOICE COIL MAGNETIC ASSEMBLY AND ROTATABLE ATTACHMENT STRUCTURE/METHOD TO BASE PLATE FOR DISC DRIVE

CONTINUATION APPLICATION INFORMATION

This Application is a continuation application of Ser. No. 08/622,925, filed Mar. 27, 1996 now U.S. Pat. No. 5,956,213 entitled LATCH MECHANISM FOR DISK DRIVE USING MAGNETIC FIELD OF ACTUATOR MAGNETS, which is a continuation application of Ser. No. 08/400,463, filed Mar. 7, 1995, now abandoned which is a continuation application of Ser. No. 08/110,539, filed Aug. 23, 1993, now abandoned which is a divisional application of Ser. No. 07/796,576, filed Nov. 22, 1991 now abandoned which is a continuation-in-part of co-pending application Ser. No. 07/549,283, filed Jul. 6, 1990, now abandoned which is a continuation-in-part of co-pending application Ser. No. 07/147,804, filed Jan. 25, 1988, now U.S. Pat. No. 4,965,684.

CROSS-REFERENCE TO RELATED APPLICATIONS

1) DISK DRIVE SYSTEM CONTROLLER ARCHITECTURE, inventors John P. Squires, Tom A. Fiers, and Louis J. Shrinkle, Ser. No. 057,289, filed Jun. 2, 1987, now U.S. Pat. No. 4,979,056;

2) DISK DRIVE SOFTWARE SYSTEM ARCHITECTURE, inventors John P. Squires, Tom A Fiers, and Louis J. Shrinkle, Ser. No. 488,386, filed Feb. 23, 1990, which is a continuation of Ser. No. 057,806, filed Jun. 2, 1987, now abandoned;

3) DISK DRIVE SYSTEM CONTROL ARCHITECTURE UTILIZING EMBEDDED REAL-TIME DIAGNOSTIC MONITOR, inventor John P. Squires, Ser. No. 423,719, filed Oct. 18, 1989, now U.S. Pat. No. 4,979,055, which is a continuation of Ser. No. 058,289, filed Jun. 2, 1987, now abandoned;

4) LOW-POWER HARD DISK DRIVE ARCHITECTURE, inventors John P. Squires and Louis J. Shrinkle, filed Aug. 7, 1990, Ser. No. 564,693, which is a continuation of Ser. No. 152,069, filed Feb. 4, 1988, now abandoned;

5) DISK DRIVE SYSTEM USING MULTIPLE EMBEDDED QUADRATURE SERVO FIELDS, inventors Louis J. Shrinkle and John P. Squires, Ser. No. 386,504, filed Jul. 27, 1989;

6) MAGNETIC PARKING DEVICE FOR DISK DRIVE, inventor, Frederick Mark Stefansky, Ser. No. 643,703, filed Jan. 22, 1991, which is a continuation of Ser. No. 269,873, filed Nov. 10, 1988, now abandoned.

7) MULTIPLE MICRO CONTROLLER HARD DISK DRIVE CONTROL ARCHITECTURE, inventors John P. Squires, Charles M. Sander, Stanton M. Keeler, and Donald W. Clay, Ser. No. 07/611,141, filed Nov. 9, 1990.

Each of these related Applications is assigned to the assignee of the subject Application and hereby incorporated by reference.

BACKGROUND OF THE INVENTION

1. Field of the Invention

The present invention relates to disk drives; more particularly, to hard (or fixed) disk drives.

2. Description of the Related Art

Developments in personal computers, portable computers and lap top computers have prompted reductions in the size and increases in memory capacity of disk drives. Attempts to provide further reductions in the size and weight, and increases in durability and memory capacity of existing disk drives have been met with limited success. The size (particularly the height) and weight of fixed or hard disk drives and the inability of existing hard disk drives to withstand physical shocks and/or vibrations have been factors which have prevented the incorporation of fixed disks in lap-top and in some cases even larger portable computers.

Existing disk drives incorporate a large number of mechanical parts. Each part in a disk drive also represents an increase in the weight of the drive and the space occupied by the drive. A large number of mechanical components makes manufacturing difficult and expensive and increases the possibility and probability of the mechanical failure of the drive. Importantly, the number of mechanical components is related to the ability of the drive to survive physical shocks and vibrations.

Resistance to physical shocks and vibrations is critical to protecting the disk or disks, the head or heads, and the various bearings in a disk drive from damage; in particular, it is necessary to prevent damage to the disks which can cause a loss of data, and damage to the heads or the bearings which can end the life of a drive, resulting in a total loss of data. Prior disk drives, however, have limited resistance to physical shocks. Resistance to physical shocks is of paramount importance in portable computers.

In conventional drives mechanical distortion or flexing of the mechanical components of a disk drive which support the heads and disks causes tracking problems by moving the heads, which are mounted at one point on the supporting components, relative to the disk, which is mounted at another point on the supporting components. The heads associated with the top and bottom surfaces of a disk can move relative to the disk to the point where the different heads are in different cylinders—a cylinder being defined as a vertical segment representing the same track on the top and bottom surfaces of a disk. This problem is known as mechanical off-track and is compounded by increased track densities.

Another problem with prior disk drives is the difficulty in sealing the drive to protect the disks from contaminants. This difficulty arises in part, from the large number of points at which access is provided to the environment in which the disk resides. These access points are utilized to bring to the interior of the disk drive electrical circuits which provide current to the motor which rotates the disk, transmit data signals to and from heads which read and record information on the disks, and in some instances, provide current to a voice coil for positioning the head (or heads) with respect to the disk or disks.

Many of these disadvantages of prior disk drives are attributable to the casing—a three-dimensional casting or so-called "toilet bowl"—in which the disks reside. Such a casing is a large, three dimensional piece of cast metal, usually aluminum, having a round portion where the disks reside—hence the name "toilet boil." A top plate covers the entire open top of the casing, forming a seal therewith.

The spindle on which the disks rotate is supported by and extends through both the casing and the cover.

The protrusion of the spindle through the casing and the cover provides possible points of entry for contaminants. Further, in disk drives using stepper motors to position the heads with respect to the disk, the stepper motor is located outside of the casing, requiring a seal between the stepper motor and the casing. Acknowledging the existence of points where contaminants can enter the disk drive, manufacturers of conventional disk drives provide a breather filter and design the disk drives so that the rotation of the disks causes the disk drives to exhaust air through leaks in the seals and to intake air only through the breather filter. However, a fairly course filter must be provided in the breather filter for a flow of air to exist, and thus contaminants enter the disk drive through the filter paper.

A cast casing is difficult to manufacture with precision, particularly the location of mounting points for elements of the drive supported by the casing. Mounting holes must be drilled after the casing is cast, and the mounting holes must be aligned with the casing and with each other. More importantly, however, a three-dimensional, cast casing flexes due to thermal stresses causing the above-mentioned mechanical off-track problems.

In conventional disk drives which use a voice coil to pivot an actuator arm in order to position the heads with respect to the disk, a flex circuit, having one end attached to the actuator arm and the other end attached to a fixed point in the disk drive, transfers the information signals to and from the heads. The standard orientation of such a flex circuit is a loop extending away from the disk. The distance between the point at which the flex circuit is attached to the actuator and the end of the disk drive is limited, and thus the radius of the arc or curve of the flex circuit is small and the length of the flex circuit itself is limited. Therefore, the entire flex circuit moves when the actuator arm is pivoted and a torque is exerted on the actuator arm by the flex circuit. The torque exerted on the actuator arm must be compensated for, either added to or subtracted from the torque created by the voice coil, when performing a seek operation. This compensation is complicated by the fact that the torque exerted on the actuator by the flex circuit varies with the position of the actuator.

Various types of locking (or latch) devices have been used to lock the arm of a voice coil in a particular position when the disk drive is not operating. The trend in latch devices is to utilize a high power unit which is separately assembled to provide reliability. However, high power latch devices generate a large amount of heat which is not desirable in a disk drive or any other area in a computer. Further, the operation of conventional latch devices can be position dependent. Thus, the orientation of the disk drive and the computer in which the disk drive is installed could effect the reliability of the latch device. Such a positional dependence of reliability is not satisfactory for portable computers.

With the ever increasing storage capacity available on individual magnetic disks, and the ever increasing speed at which microprocessors such as Intel's 80386 and 80486 chips operate, the data access time of the disk drive is critical to overall system performance. In many cases, the speed at which the disk accesses data and provides it to the microprocessor is the main performance bottleneck in the system. One critical factor in disk access time is the "seek time" of a drive, generally defined as the time the actuator takes to access particular data at a particular track location on the magnetic disk. The total access time is generally a function of the efficiency of the actuator motor in moving the read/write heads along the arcuate path between consecutive tracks of the disk, and the data throughput of the control electronics.

SUMMARY OF THE INVENTION

It is, therefore, an object of the present invention to provide a disk drive having a low height and a low weight.

A further object of the present invention is to provide a multiple platter (disk), disk drive having a one inch height form factor.

Another object of the present invention is to provide a disk drive which is resistant to damage from physical shocks.

Another object of the present invention is to provide a low height disk drive having an increased data storage capacity.

Another object of the present invention is to provide a disk drive in which any mechanical off tracking of the heads is mechanically minimized and electronically corrected.

Another object of the present invention is to provide a disk drive assembly in which a single electrical connector transfers all electrical currents and data signals from the environment in which the disks reside to the exterior of the environment, and in which a header which communicates those electrical signals through the base plate is the only communication between the interior and exterior of the drive.

Another object of the invention is to provide an improved voice coil motor design, and specifically a disk drive having an efficient actuator positioning mechanism.

These and other objects of the present invention are provided by a disk drive, including: a head-disk assembly, having a base having a top and a bottom, storage means, supported on said top of said base, for storing data, solid storage means comprising two disks, interactive means for reading information from and writing information on said disks, actuator means, supported on said base and responsive to control signals, for selectively positioning said interactive means with respect to said disks means, and a cover sealably attached to said base to enclose said disks, said interactive means, and said actuator means; and control means, mounted on said head-disk assembly so that said control means is adjacent to said bottom of said base, for generating control signals to control said actuator means and for providing information signals to and receiving information signals from said interactive means, said head-disk assembly, said control means having an overall maximum height of approximately one inch (1").

A specific advantage of the present invention is that the disk drive has a reduced height with respect to conventional disk drives utilizing disks of approximately the same diameter. In particular, the three and one-half inch (3.5") single platter and multiple platter drives of the present invention have an overall height of one inch (1"). Furthermore, the disk drive of the present invention is light in weight—the drives of the present invention weighs slightly more than one pound.

A further advantage of the present invention is that a single electrical connector (header) transfers all electrical signals between the exterior and the interior of the casing, thereby reducing the possibility of the introduction of contaminants into the controlled environment within the casing. Importantly, the disk drive of the present invention does not require a breather filter.

A further advantage of the disk drive of the present invention is that it includes a voice coil actuator assembly including means for mounting a plurality of read/write heads with respect to a storage means; and means for positioning said mounting means at a plurality of positions with respect to said disk, wherein said means for positioning has relatively equal efficiency between the inside diameter and the outside diameter of the disk.

BRIEF DESCRIPTION OF THE DRAWINGS

FIGS. 1–7 illustrate a first embodiment of the disk drive of the present invention. In particular:

FIG. 1 is an isometric view of the first embodiment of a disk drive according to the present invention;

FIG. 2 is an isometric view of the first embodiment of the disk drive of the present invention with the cover removed;

FIG. 3 is a cross-sectional view along line 3-3' of FIG. 2;

FIG. 4 is an exploded view of the first embodiment of the disk drive of the present invention;

FIG. 5 is an end view of the first embodiment of the disk drive of the present invention;

FIG. 6 illustrates the actuator assembly; and

FIG. 7 illustrates the latch mechanism.

FIG. 8 is an isometric view of the second embodiment of a disk drive according to the present invention with the cover removed;

FIG. 9 is an exploded isometric view of the second embodiment of the disk drive of the present invention;

FIG. 10 is an exploded, isometric, bottom view of the printed circuit board and the base of the second embodiment of a disk drive according to the present invention;

FIG. 11 is an end view of the second embodiment of a disk drive according to the present invention;

FIG. 12 is an exploded, isometric view of a portion of the actuator and the latch mechanism utilized in the second embodiment of the present invention.

FIGS. 13–19 illustrate a third embodiment of the disk drive of the present invention. In particular:

FIG. 13 is an exploded, isometric view of the third embodiment of the disk drive according to the present invention;

FIG. 14 is a plan view of the third embodiment of the disk drive according to the present invention;

FIG. 15 is a view along line 15—15 in FIG. 14;

FIG. 16 is an exploded, partial view of the actuator assembly of the third embodiment of the disk drive of the present invention;

FIG. 17 is a partial plan view of the actuator assembly of the third embodiment of the present invention;

FIG. 18 is a cross-sectional view along line 18—18 in FIG. 17;

FIG. 19 is an enlarged, cross-sectional view of the gasket and cover assembly along line 19—19 in FIG. 13.

DESCRIPTION OF THE PREFERRED EMBODIMENTS

Disk drives according to the present invention will be described with reference to FIGS. 1–24. The disk drives described herein include, for example, one or two hard disks with a magnetic coating and utilize Winchester technology; however, the disk drive of the present invention may utilize various numbers of disks and other types of disks, for example, optical disks, and other read/write technologies, for example, lasers. The diameter of the disks utilized in the disk drive of the present invention have a diameter on the order of 3.75 inches, or so-called "3½ inch" disks; the disk drive of the present invention can be implemented with disks of other diameters whether larger or smaller than 3.75 inches.

A disk drive in accordance with either the first, second, or third embodiments of the present invention has the following outline dimensions: Height 1.0" (2.54 cm); Length 5.75" (14.61 cm); and Width 4.0" (10.16 cm). The total weight is slightly over one (1) pound; for the first embodiment, 1.3 lbs (0.59 kg) for the second embodiment, and 1.16 lbs for the third embodiment. Thus, the disk drive of the present invention is one-half (½) of the size of a one-half (½) height 5¼" inch disk drive. Importantly, the disk drive of the present invention weighs approximately ⅓ to ½ of the weight of standard 3½" disk drives of 20 Mb capacity. Even greater proportional reductions are provided when the first embodiment is formatted for 40 Mb capacity, and the second embodiment is formatted for 120 Mb capacity, and the third embodiment is formatted with a storage capacity of approximately 213 Mb, without any change in size or weight.

Figure 1:
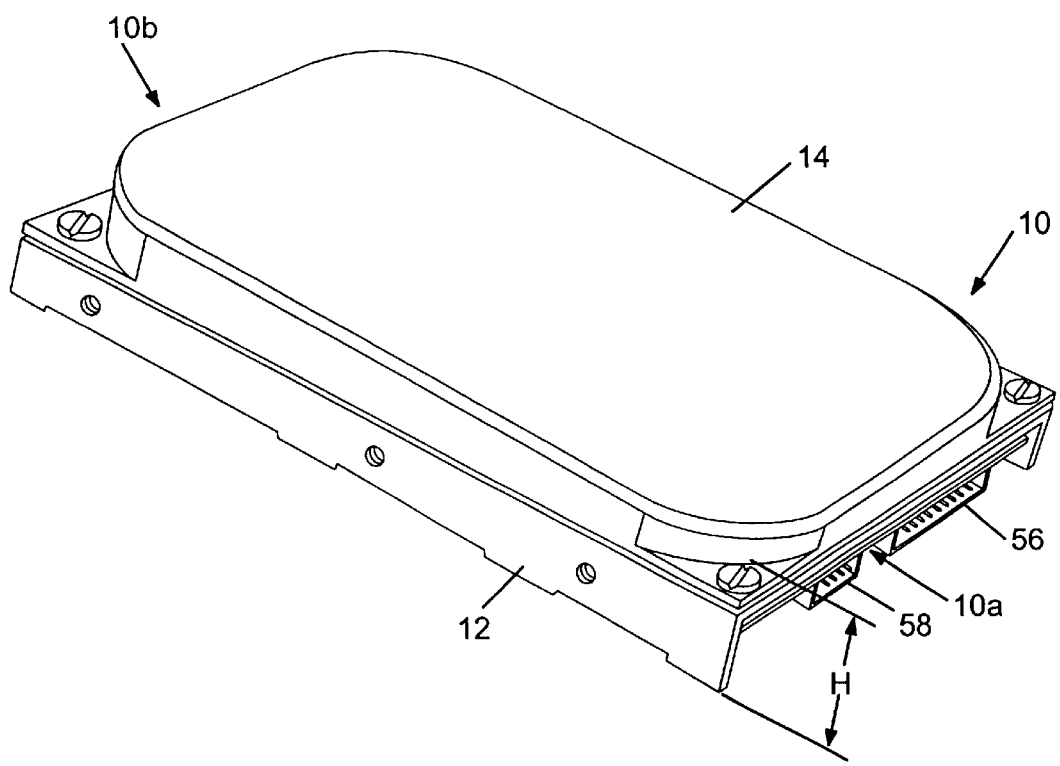
Figure 14:
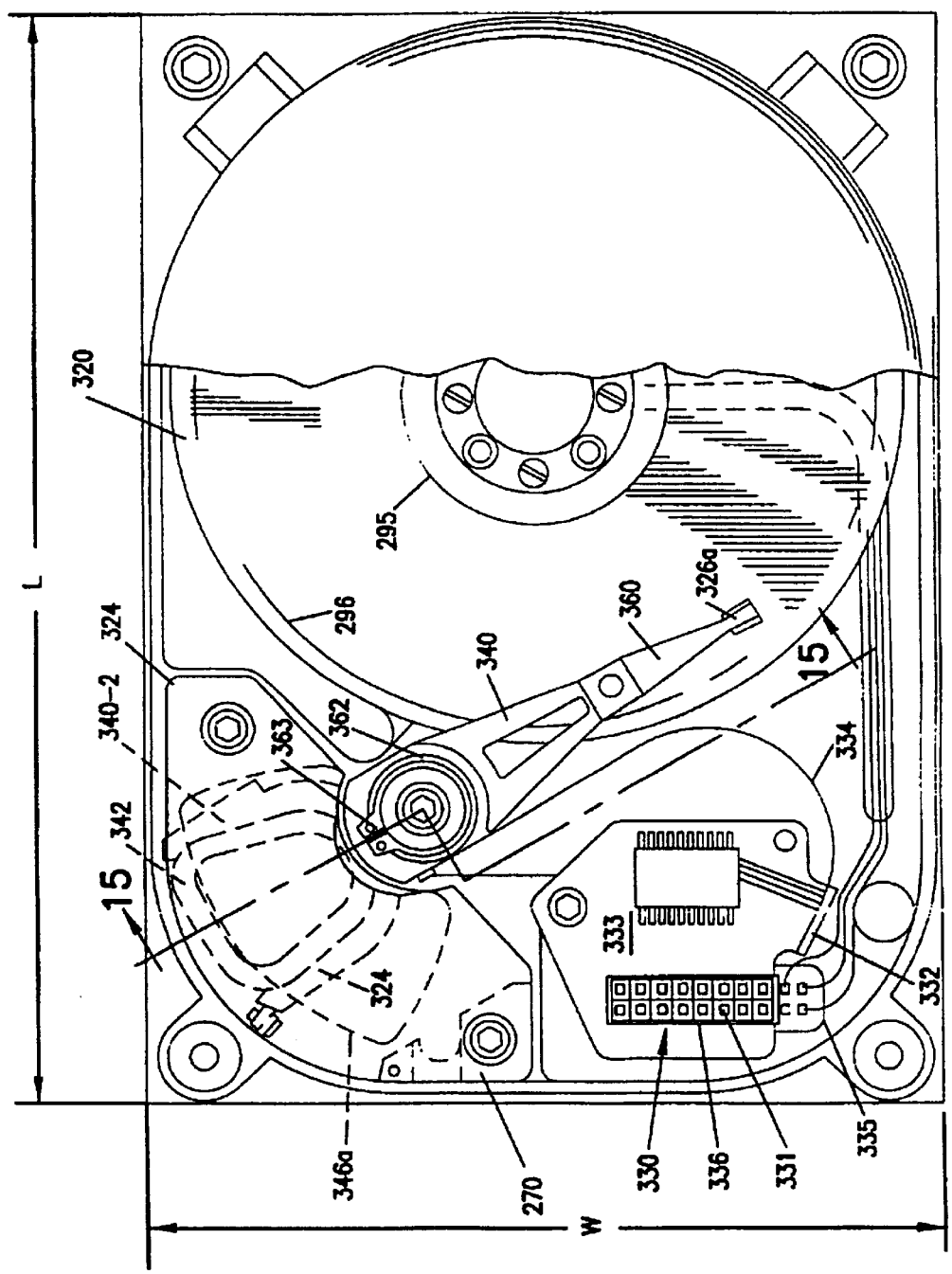
Figure 15:
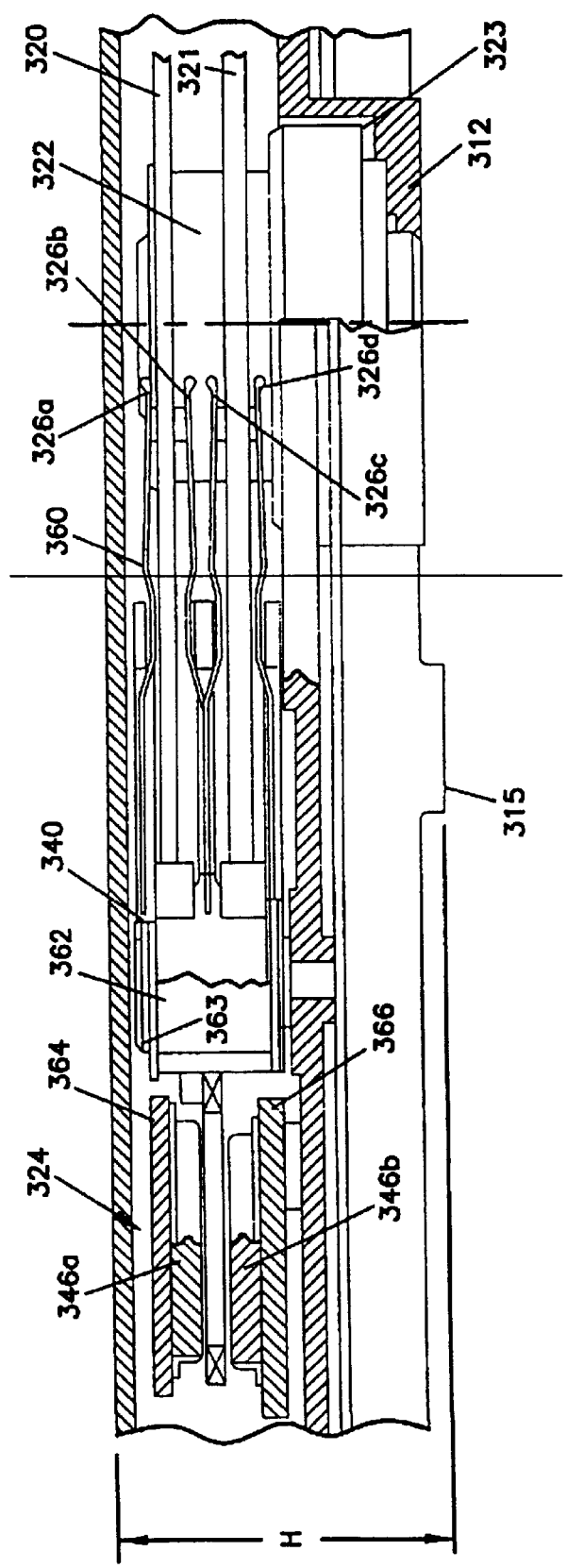

Although not to scale, FIGS. 1, 14, and 15 illustrate the relationship between the length, width, and height of the disk drive, and thus low profile of the disk drive. In particular, the height "H" of the disk drive of the present invention is one inch (1").

First Embodiment and Common Features

One feature of the first embodiment which provides the low height of the drive is the sloped profile of base plate 12 and cover 14. The sloped profile provides extra vertical space below base plate 12 at the first and 10*a* of the disk drive and provides extra vertical space between base plate 12 and cover 14 at the second end 10*b* of the disk drive 10. If the sloped profile were not provided, the amount of space allocated above and below base plate 12 would be the maximum amount of space provided at the respective first and second ends 10*a*, 10*b* of the disk drive 10; accordingly, the overall height of the disk drive would be increased. The cover 14 is sealably attached to base plate 12 to provide a controlled environment between base plate 12 and cover 14. A gasket 16 (FIG. 4) between base plate 12 and cover 14 provides the seal. The ability to provide a controlled environment alleviates the need for a breather filter and allows the disk drive of the present invention to use an internal air filtration system. The seal provided by gasket 16 is stable, during operation of the disk drive, at pressures experienced at altitudes from 200 feet below sea level to 10,000 feet above sea level.

Figure 2:
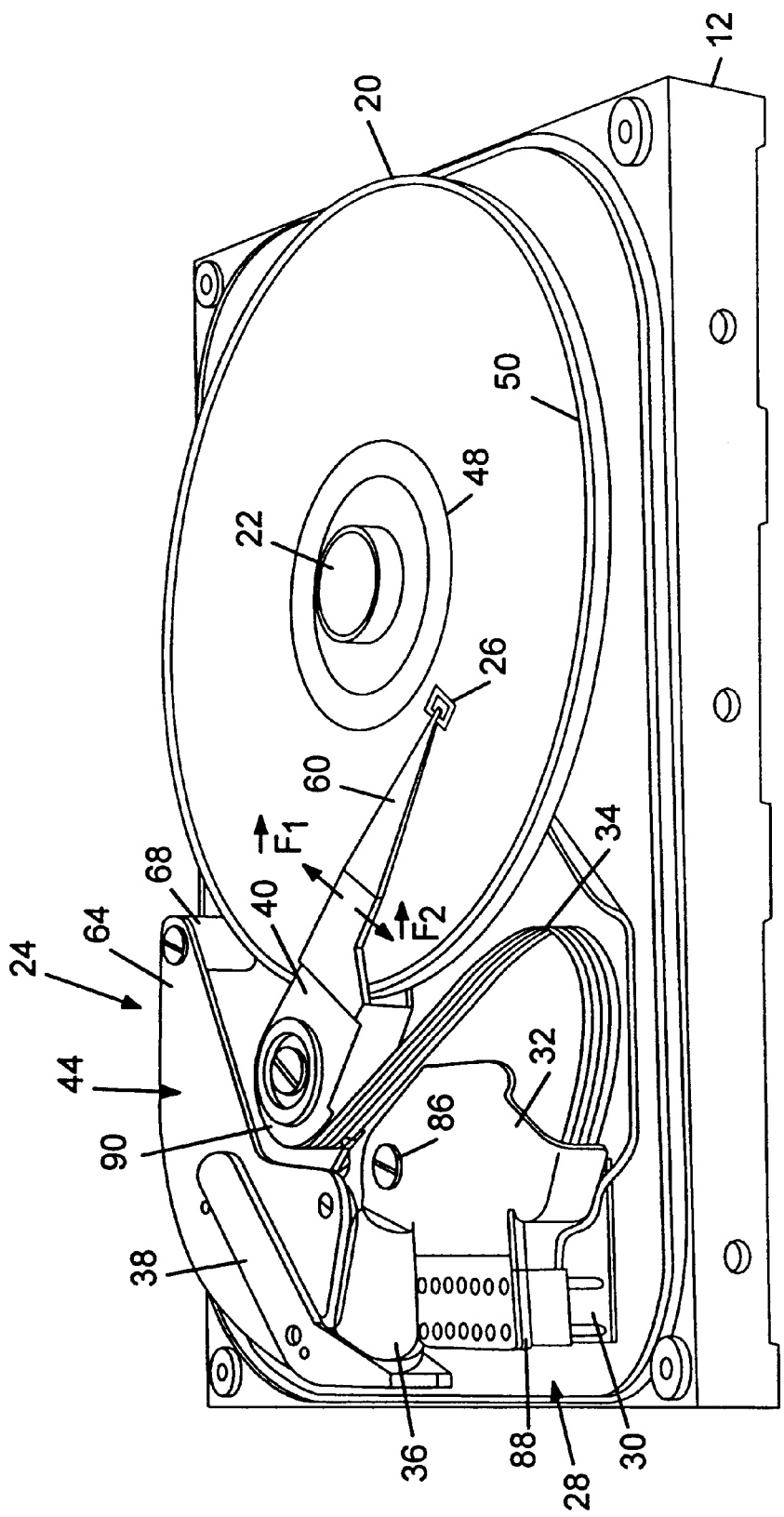

As shown in FIG. 2 the internal components of the disk drive are separated into three interrelated groups: disk 20 and spin motor 22, actuator assembly 24 for positioning heads 26 with respect to disk 20, and header assembly 28 including header 30, bracket 32, reverse flex circuit 34 and coil 36 for pivoting latch arm 38.

Actuator assembly 24 includes pivotable actuator arm 40, heads 26 (FIG. 4) mounted at a first end of actuator arm 40, an actuator coil 42 mounted at a second end of actuator arm 40 on the opposite side of the pivot point from the first end of the actuator arm, and a magnet structure 44. Magnet structure 44 supports magnets 46 (FIG. 4) and its components, as described in detail below, are formed of magnetically permeable material to provide returns for the magnetic fields generated by magnets 46. The magnet structure 44 and actuator coil 42 are arranged so that a current in coil 42 passes through the magnetic fields created by magnets 46 to create a force which pivots actuator arm 40. Currents passing in opposite directions of coil 42 create torques in opposite directions and pivot actuator arm 40 to position heads 26 at all locations between and including inside and outside diameters 48 and 50 of disk 20.

In a conventional disk drive utilizing a voice coil, a flex circuit is provided in the region between header 30 and actuator arm 40. Reverse flex circuit 34 curves toward the disk, thereby allowing latch coil 36 to be placed between header 30 and actuator arm 40.

A printed circuit assembly (or control means) 52 is attached to the bottom of base plate 12. Header 30 carries all of the electrical signals from the printed circuit assembly 52 to the controlled environment between base plate 12 and cover 14. Header 30 has a minimum number of pins due to the fact that a DC motor requiring only three (3) leads is utilized. Such a motor is described in U.S. Pat. No. 4,876,491, entitled METHOD AND APPARATUS FOR BRUSHLESS DC MOTOR SPEED CONTROL, filed Jul. 1, 1986, inventors John P. Squires and Louis J. Shrinkle, assigned to the Assignee of the subject application.

The structure of the disk drive 10 of the present invention which provides the disk drive with a low overall height will be described with reference to FIG. 3, which is a cross-sectional view along line 3-3' in FIG. 2, and FIG. 5. As shown in FIG. 5, base plate 12 includes two rails 54a and 54b at first and second sides 12a and 12b respectively of base plate 12. Rails 54a and 54b are constructed so that the mounting surface 12e of the base plate 12 sits at an angle with respect to the plane of the surface on which rails 54a and 54b rest. This angled relationship of base plate 12 and the support surface provides more room below base plate 12 at the first end 12a of the base plate than at the second end 12b of the base plate. Only a small amount of space is necessary for printed circuit assembly 52, including the components mounted thereon; however, it is necessary to provide a connector 56 and a power plug 58 on printed circuit assembly at the first end 12a of base plate 12 (FIG. 1), both of which require more vertical space than the printed circuit assembly 52. The slope of base plate 12 provides the necessary vertical space for connector 56 and power plug 58 beneath the first end of the base plate 12a. Connector 56 provides an interface between the printed circuit assembly 52 and a host computer (not shown) and power plug 58 provides an interface between printed circuit assembly 52 and an external power source (not shown).

Conversely, disk 20 is the only component located above the first end of the base plate 12a, whereas the actuator assembly 24 is located above the second end of the base plate 12b. Actuator assembly 24 requires more vertical space than disk 20 and the slope of base plate 12 provides more space above the second end of the base plate 12b than above the first end of the base plate 12a in order to accommodate the actuator assembly 24. As shown in FIG. 1 the portion of cover 14 which meets with base plate 12 has an angle which corresponds to the angle of the base plate, and thus the top of the cover 14 is parallel with the support surface. Therefore, even though the base plate is sloped, the profile of the disk drive 10 is a rectangle as opposed to a parallelogram.

Disk 20 lies in a plane which is parallel to the support surface and which forms an angle with the plane of base plate 12. All of the support points on the mounting surface 12e of base plate 12 are designed so that the internal components (e.g., actuator assembly 24) lie in plane parallel to the plane of disk 20 and the plane defined by support points 55 of rails 54a, 54b.

The structure and operation of actuator assembly 24 will be explained with reference to FIGS. 4–7. The function of the actuator assembly 24 is to position heads 26 with respect to the surfaces of disks 20 by pivoting actuator arm assembly 40. More specifically, to position the heads 26 over individual tracks on disk 20. Heads 26 are supported on actuator arm 40 by flexures 60. A bearing cartridge 62, which is fixed to the base plate 12, is inserted in actuator arm 40 to provide a pivot point. Actuator arm 40 is attached to bearing cartridge 62 by a clip ring 63. Using clip ring 63 instead of epoxy allows the bearing cartridge 62 to be tested prior to assembly and cleaned independently of the actuator arm 40. Actuator coil 42 is provided on actuator arm 40 on the opposite side of the pivot point from heads 26. Actuator arm 40, including all of the components attached thereto, is precisely balanced, i.e., equal amounts of weight are provided on either side of the pivot point so that the positioning of heads 26 is less susceptible to linear shock and vibration.

The force utilized to pivot arm assembly 40 is provided by a voice coil assembly. The voice coil assembly includes actuator coil 42 and magnet structure 44. Magnet structure 44 comprises top and bottom plates 64, 66 formed of magnetically permeable material, support posts 68, 70 also formed of magnetically permeable material, and first and second magnets 46a, b attached to the top plate 64. Top and bottom plates 64, 66 in conjunction with support posts 68, 70 function as returns for the magnetic fields provided by first and second magnets 46a, b. It is important that there are no air gaps between support posts 68, 70 and either the top or bottom plate 64, 66; any air gap would create a discontinuity in the return, greatly reducing the strength of the magnetic field.

First and second magnets 46a, b have opposite poles attached to top plate 64 (e.g., the south pole of first magnet 46a and the north pole of second magnet 46b are attached to top plate 64) to provide first and second magnetic fields $\vec{B}_1$, $\vec{B}_2$ between respective ones of the first and second magnets 46a, b and bottom plate 66. First and second magnetic fields $\vec{B}_1$, $\vec{B}_2$ are encompassed in three closed magnetic field loops. The first closed magnetic field loop extends between the first magnet 46a and bottom plate 66 and passes through a return provided by bottom plate 66, first support 68, and top plate 64. The second closed magnetic loop passes from first magnet 46a to bottom plate 66, through bottom plate 66 and between bottom plate 66 and second magnet 46b, and from second magnet 46b to first magnet 46a via top plate 64. The third closed magnetic loop extends between bottom plate 66 and second magnet 46b and passes through a return provided by top plate 64, second support 70, and bottom plate 66. By containing the magnetic fields $\vec{B}_1$ and $\vec{B}_2$, in returns, the magnetic field intensity of each field is increased in the region between the respective first and second magnets 46a, b and bottom plate 66; the strength of the magnetic field in this region is directly related to the torque which the voice coil exerts on the actuator arm 40, and thus the rotational velocity of actuator 40 and the seek times for the drive.

Actuator coil 42 is positioned so that it carries a current in opposite directions in first and second magnetic fields $\vec{B}_1$ and $\vec{B}_2$.

The force on a current carrying wire in a magnetic field is proportional to the magnetic field intensity, and is expressed by the equation $\vec{F} = id\,\vec{l} \times \vec{B}$, where $\vec{F}$ is the force, i is the current, $\vec{l}$ is the length of the wire, and $\vec{B}$ is the magnetic field. Passing a current in opposite directions in actuator coil 42 provides respective forces $\vec{F}_1$ and $\vec{F}_2$ (FIG. 2); these forces $\vec{F}_1$ and $\vec{F}_2$ pivot actuator arm 40 in opposite directions.

Crash stops are provided to limit the pivoting movement of actuator arm 40 so that heads 26 travel only between selected inside and outside diameters 48, 50 of disk 20. An outside diameter crash stop is provided by a sleeve 76 (FIG. 5) fitted on support post 68. When the pivoting motion of actuator arm 40 places heads 26 at the outside diameter 50 of disk 20 a portion of the actuator arm 40 contacts outside diameter crash stop 76, thereby preventing further movement of the heads 26. An inside diameter crash stop is provided by the portion of the latch mechanism (FIG. 7) and is described below.

Reverse flex circuit 34 for carrying electrical signals from header 30 to heads 26 and actuator assembly 24 will be described with reference to FIGS. 2, 4, 6 and 7. The reverse flex circuit is separated into three portions. A first portion 80 carries current to actuator coil 42. A second portion 82 is a ground plane which separates the current carrying portion 80 from a third data carrying portion 84. The data carrying portion 84 provides signals to heads 26 for recording information on disk 20 and carries signals from the heads 26 to the printed circuit assembly 52, via header 30, when reading data from disk 20. Interference with the relatively weak data signals which would otherwise be caused by the larger currents necessary for actuator coil 42 passing through the first portion 80 of the reverse flex circuit 34 is prevented by the provision of ground plane 82.

The reverse flex circuit 34 is electrically connected to pins 31a of header 30; however, pins 31a also serve to position the reverse flex circuit 34. In particular, bracket 52 supports reverse flex circuit 34 and latch coil 36. Bracket 32 is attached to base plate 12 by a single attachment point 86 and is rotationally positioned by the engagement of reverse flex circuit 34 and pins 31a—the positioning of latch coil 36 being important to the operation of the latch mechanism as described below. A stiffener 88 is attached to reverse flex circuit 34 in the area where it engages pins 31a and is attached to bracket 32 to provide the rigidity necessary to rotationally position bracket 32, and to facilitate engagement of reverse flex circuit 34 and pins 31a. Reverse flex circuit 34 is parallel to the plane of base plane 12 in the region of header 31 but passes through a bend of approximately 90 degrees so that it forms the loop which extends towards disk 20 and connects header 30 to actuator assembly 24.

First portion 80 of reverse flex circuit 34 terminates at the point where reverse flex circuit 34 joins actuator arm 40; however, the second and third portions 82 and 84 wrap around a shoulder 90 of actuator arm 40 which surrounds bearing cartridge 62. Wrapping the second and third portions 82 and 84 of reverse flex circuit 34 around shoulder 90 provides access to current-carrying wires are provided on the side of the flex circuit which faces the base plate in the region where reverse flex circuit 34 engages pins 31a of header 30, and thus on the inside of the curved portion of reverse flex circuit 34 extending from bracket 32 to actuator arm 40. As the first and second portions 82 and 84 wrap around shoulder 90, the side of reverse flex circuit 34 on which the current-carrying wires are provided is exposed at the end of reverse flex circuit 34, facilitating the attachment of wires 91 which connect heads 26 to reverse flex circuit 34. If wires 91 were to be connected to reverse flex circuit 34 at the point where reverse flex circuit 34 first contacts actuator arm 40, it would be necessary to wrap wires 90 around reverse flex circuit 34 or to provide connections through the reverse flex circuit 34—both being more complex and less desirable manners of providing electrical connections between wires 91 and reverse flex circuit 34. Any torque exerted on actuator arm 40 by any means other than the voice coil assembly affects the function of actuator assembly 24 in positioning heads 26 with respect to disk 20, particularly the track following any seek functions described in the above-referenced patents entitled DISK DRIVE SOFTWARE SYSTEM ARCHITECTURE and DISK DRIVE SOFTWARE SYSTEM ARCHITECTURE UTILIZING IMBEDDED REAL TIME DIAGNOSTIC MONITOR. The force provided by the voice coil assembly must be controlled to compensate for the force exerted by the reverse flex circuit 34. Accordingly, the radius R (FIG. 7) of the curve in reverse flex circuit 34 is made as large as possible to minimize the torque exerted on actuator arm 40 by reverse flex circuit 34. Indeed, the radius of the curve in reverse flex circuit 34 is approximately twice as large as the radius in the curve of a conventional flex circuit. In addition, the reverse flex circuit 34 moves in an essentially linear manner when actuator arm 40 rotates, whereas a conventional reverse flex circuit must bend throughout its curve. Accordingly, the torque exerted on actuator arm 40 by reverse flex circuit is greatly reduced with respect to the torque exerted by a conventional flex circuit.

Another advantage provided by reverse flex circuit 34 is the ability to place latch coil 36 in a position where a conventional flex circuit would be located, and thus to integrate latch coil 36 with reverse flex circuit 34 and bracket 32. Separate wires from header 30 to latch coil 36 are not necessary. Further, installing this integrated group of components requires fewer steps than installing individual components. In addition, the critical positioning of latch coil 36 is provided by reverse flex circuit 34 and stiffener 88 controlling the pivotal position of bracket 32, as described above.

All connections between the sealed environment between base plate 12 and cover 14 and printed circuit assembly 52 are provided by header 30. Pins 31a, which engage reverse flex circuit 34, also engage motor wire connector 92. Pins 31b extend below base plate 12 and engage a rear entry connector (not shown) on printed circuit assembly 52. A rear entry connector is utilized because the integrated and discrete circuit components and the surface wirings are on the side of printed circuit assembly 52 facing away from base plate 12.

Figure 4:
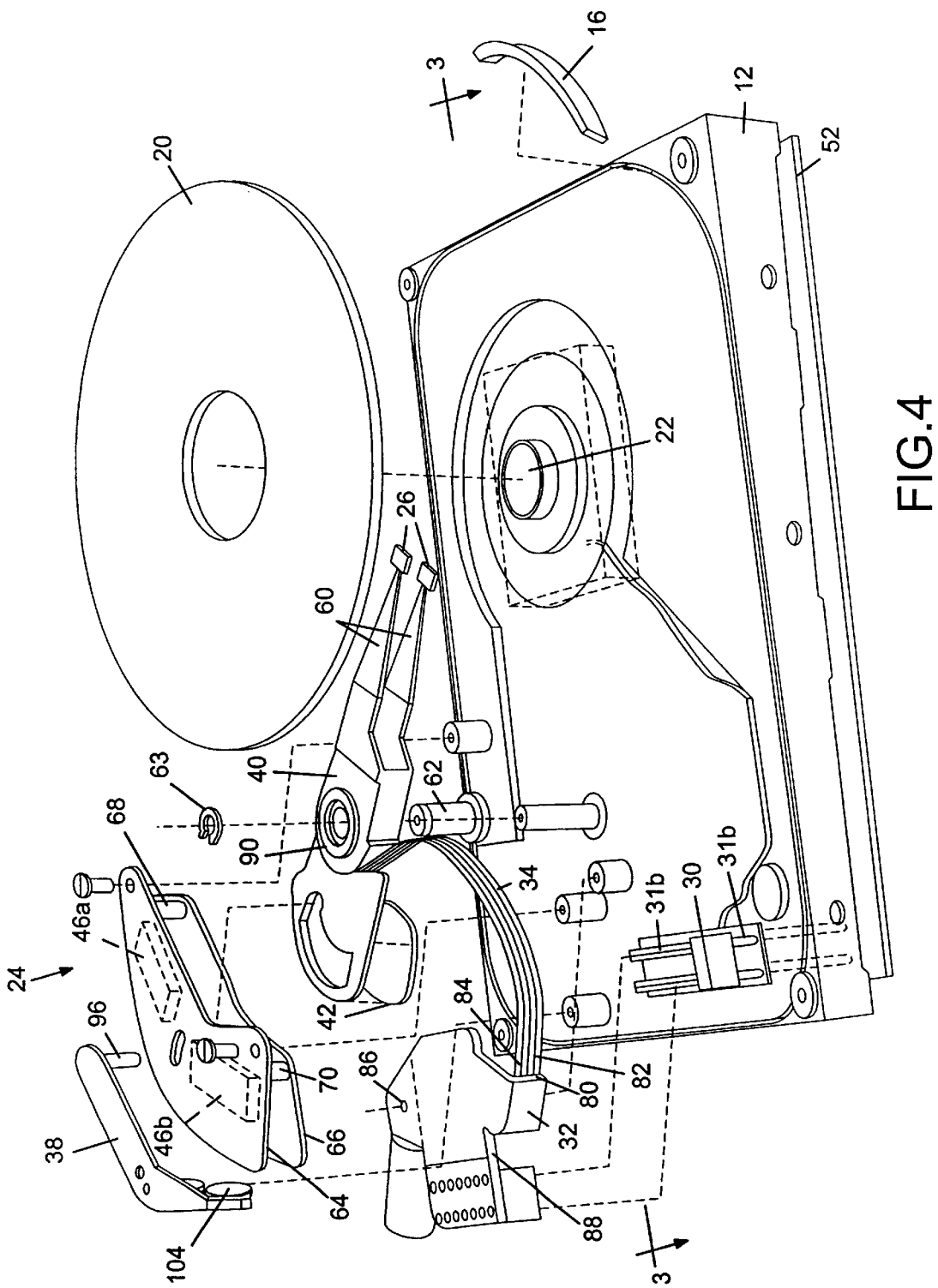
Figure 6:
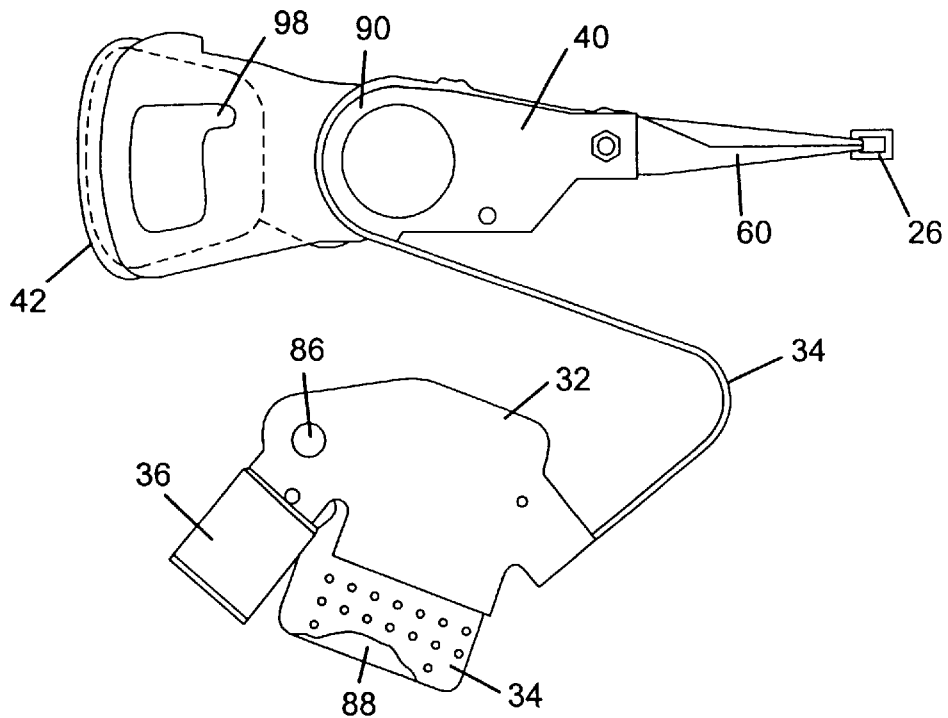
Figure 7:
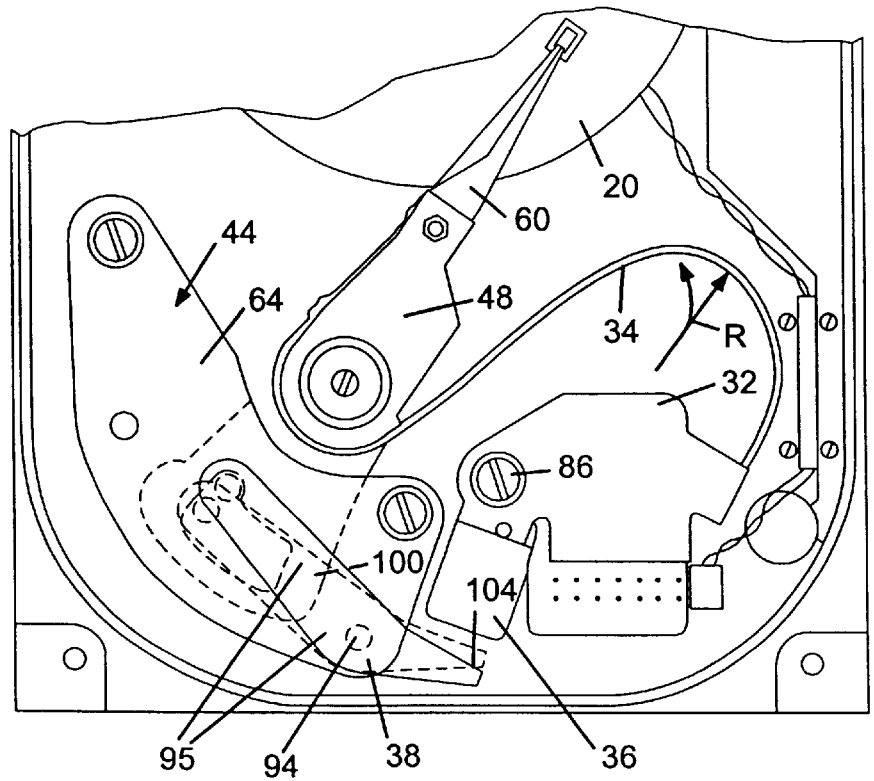

A latch mechanism for locking the actuator arm 40 in an orientation where heads 26 are positioned at the inside diameter 48 of disk 20, will be described with reference to FIGS. 4, 5 and 7. During power-down of the disk drive 10 control means 52 causes actuator assembly 24 to pivot the actuator arm 40 to the position where the heads 26 are at the inside diameter of the disk over a non-data area of disk 20 before the rotational speed of the disk 20 is decreased to the point where the heads 26 land on the disk 20. Thus, the heads 26 land only on the non-data area at the inside diameter of the disk 20.

The electromagnetic latch includes latch coil 36, a latch arm 38 which pivots on pivot 94 and has a finger 96 for engaging latch notch 98 in actuator arm 40, and a spring 100 for biasing the latch arm 38 to the locked position.

An electromagnet, including latch coil 36 and swivel plate 104, is used to pivot latch arm 38 to the unlocked position against the force of spring 100. Latch coil 36 includes a capture plate 106 having an outer wall 108 and a center pole 110. The outer wall 108 and center pole 110 form opposite poles of an electromagnet, and when a current is passed through a coil (not shown) the magnetic field of capture plate 106 attracts swivel plate 104; swivel plate 104 is mounted on the latch arm 38 so that it can swivel in all directions and be flush with the outer wall 108 when the swivel plate 104 is captured by the electromagnet. Contact between the entire outer wall 108 and swivel plate 104 is necessary to provide reliability in the capture and retention of the swivel plate 104. Center pole 110 of capture plate 106 is stepped so that only a small contact area exists between center pole 110 and swivel plate 104; this small contact area causes the latch coil 36 to release the swivel plate 104 when the current in the coil (not shown) is discontinued. A high DC voltage is applied to the latch coil 36 for a short time to capture the swivel plate 104. Then, the applied voltage is reduced to a small capture maintenance level. Thus, this structure is low in power consumption and heat dissipation. Further, despite the low power consumption of the latch coil 36 it is highly reliable in its capture, holding, and release of swivel plate 104.

Spring 100 is a linear spring engaging finger 96. To reduce spring travel, thereby providing a constant and larger spring force, spring 100 is terminated outside the pivot point of pivot 94.

Finger 96 also serves as the inside diameter crash stop. Finger 95 is well suited for the inside diameter crash stop because it is positioned to engage notch 98 which is at one edge of opening 102 in actuator arm 40. The abutment of finger 96 and the same edge of opening 102 when the latch is unlatched provides the inside diameter crash stop. However, the pivoting movement of latch arm 38 in moving to the latched position reduced the distance between pivot 94 and the edge of opening 102. Therefore, the actuator arm 40 pivots slightly to move the heads beyond the inside diameter 48 to a non-data area.

The above-described structure of the disk drive of the present invention provides excellent protection from shock and vibration. In particular, the disk drive will withstand nonoperating shocks of 200 g's and operating shocks, without nonrecoverable errors, of 5 g's. Nonoperating vibration of 2 g's in the range of 5–500 Hz is the specified tolerable limit. Operating vibration, without nonrecoverable data, is specified at 0.5 g's for the range of 5–500 Hz.

The disk 20 has 752 tracks per surface due to the ability of the actuator assembly 24 to operate with a track density of 1150 tracks per inch. Thus, utilizing 26 blocks per track and 512 bytes per block, the disk drive of the first embodiment has a formatted capacity of 20 MBytes. The actuator assembly 24 provides an average seek time of 28 ms and a track-to-track seek time of 7 ms. The average seek time is determined by dividing the total time required to seek between all possible ordered pairs of track addresses by the total number of ordered pairs addressed.

The assembly of the disk drive 10 of the present invention requires less steps than assembly of conventional disk drives. The spin motor 22 and disk 20 are attached to base plate 12. Then, an integrated actuator group, including actuator arm 40, bracket 32, reverse flex circuit 34, and latch coil 36, all previously assembled, is installed. Magnet structure 44 is then placed on one of its attachment points and pivoted into position so that the portion of actuator arm 40 holding actuator coil 42 extends between the top and bottom plates 64, 66 of the magnet structure 44. Latch arm 36 is then placed on its pivot point. The disk 20 is then pack written, and thereafter cover 14 is attached. Finally, printed circuit assembly 52 is attached outside of the clean room.

Second Embodiment

A disk drive 200 in accordance with the second embodiment of the present invention will be described with reference to FIGS. 8–12.

Figure 8:
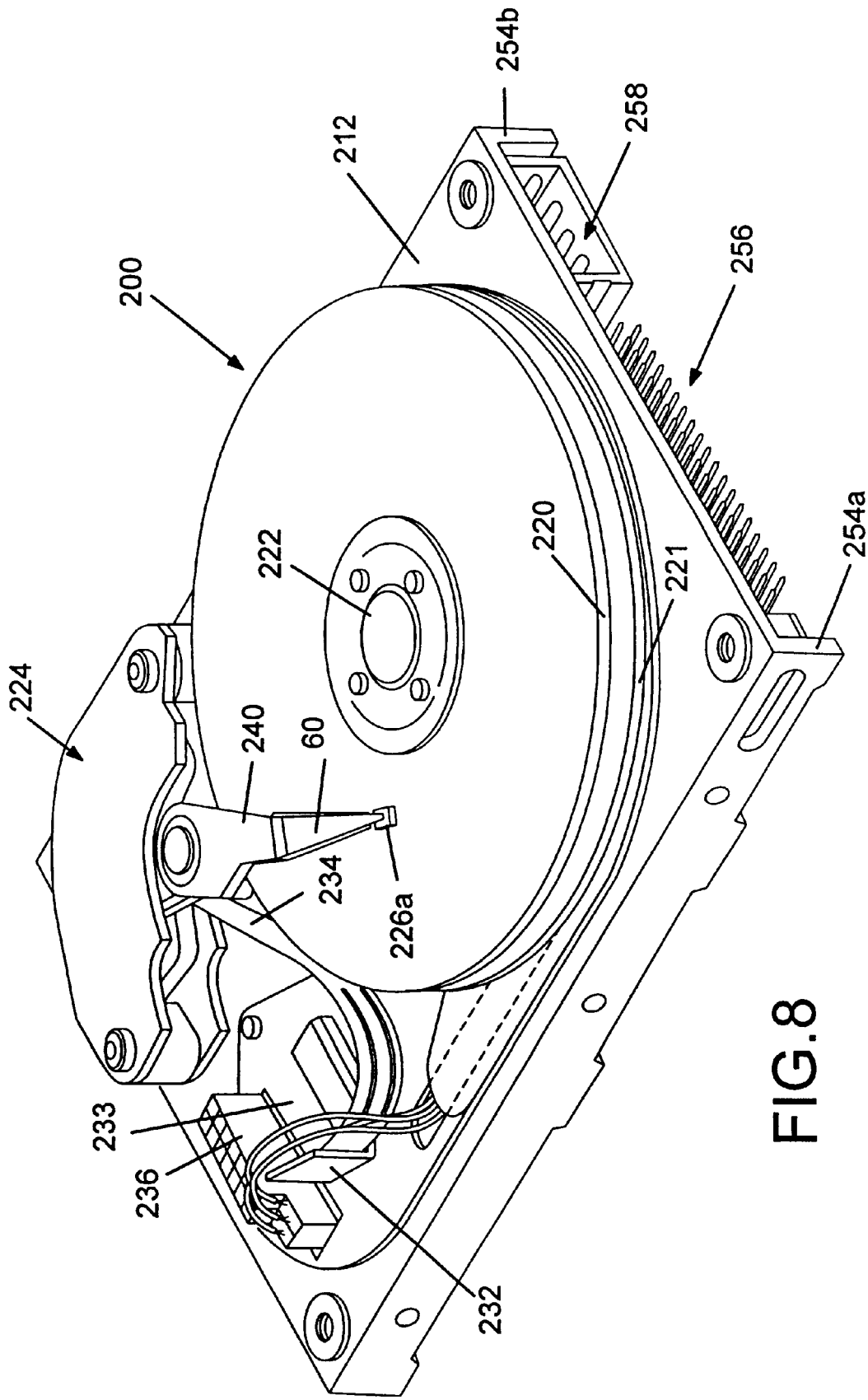
FIGS. 8–12 illustrate a second embodiment of the disk drive of the present invention. In particular.
Figure 9:
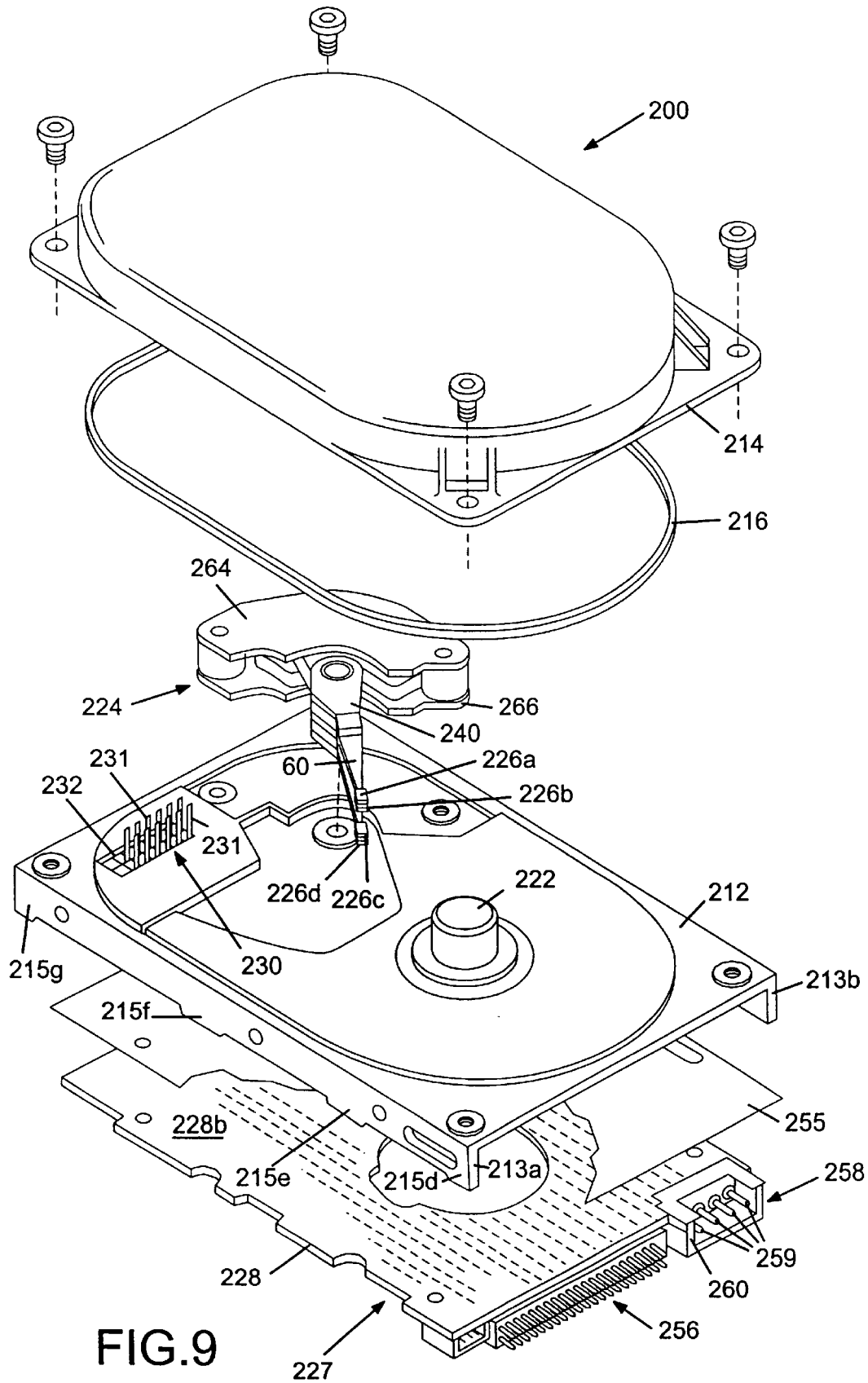
Figure 10:
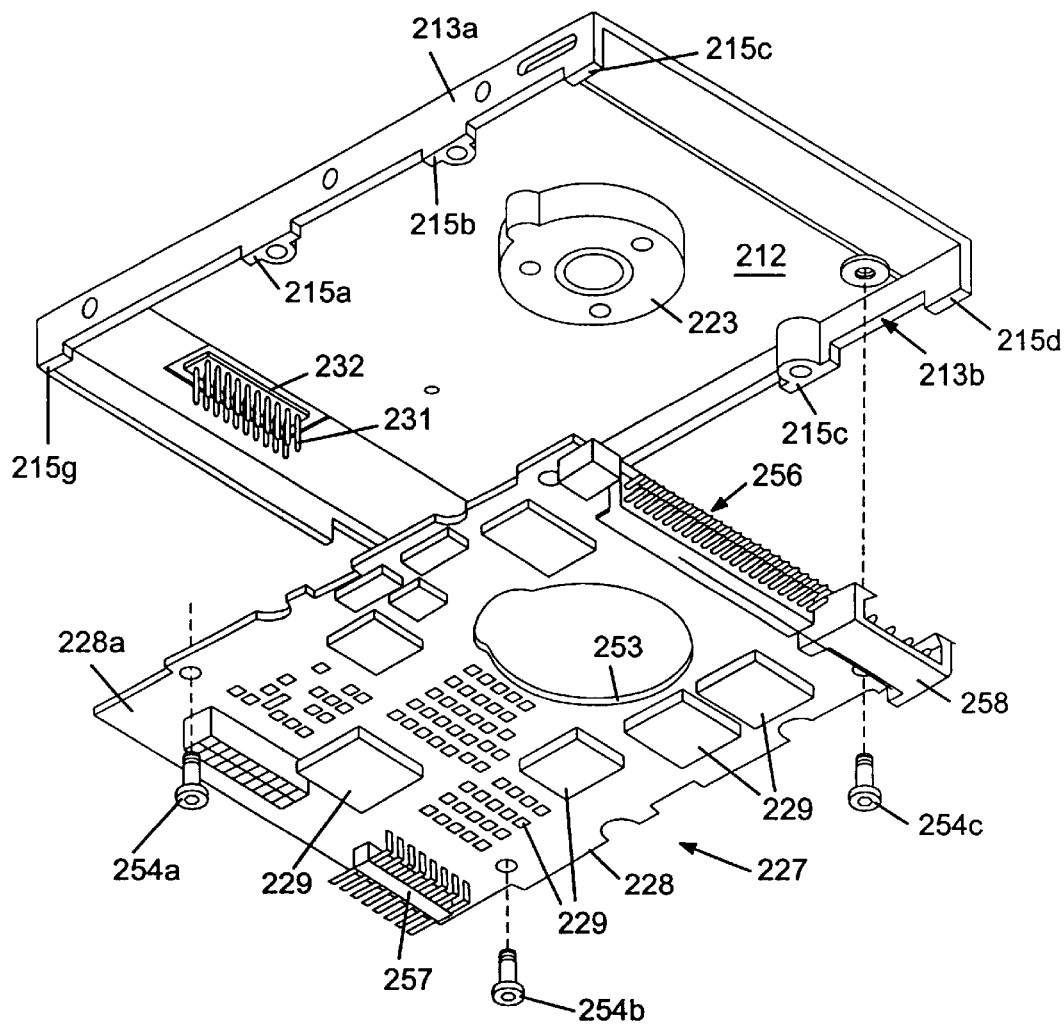

As shown in FIGS. 8–10, the construction of disk drive 200 includes a base 212 and a cover 214. Gasket 216 provides a sealed, controlled environment between base 212 and cover 214. First and second disks 220, 221 are supported on base 212 and rotated by spin motor 222. Motor 222 is mounted in a well 223 in base 212, thereby allowing lower disk 221 to be as close as possible to the top surface of base 212.

An actuator assembly 224 positions heads 226a–d with respect to disks 220 and 221; heads 226a and 226b read information from and write information to respective, opposed surfaces of disk 220, and heads 226c and 226d read information from and write information to respective, opposed surfaces of disk 221. Tables 1 and 2 below specify certain characteristics of disks 220 and 221 and heads 226a–d.

TABLE 1

| | | |
|---|---|---|
| Number of Disks | 2 | |
| Number of Data Surfaces | 4 | |
| Number of Data Cylinders (Tracks per surface) | 1522 | cylinders |
| Sectors per Track | 40 | physical |
| | 39 | accessible |
| Bytes per Sector | 662 | |
| Data Bytes per Sector | 512 | bytes |
| Data Capacity per Data Surface (fomatted) | 30 | Mbytes |
| Total Data Capacity (formatted) | 120 | Mbytes |

TABLE 2

| | | |
|---|---|---|
| Disk Diameter | 95 | millimeters |
| | 3.74 | inches |
| Data Track Band Width | 20.32 | millimeters |
| | 0.8 | inches |
| Track Density | 1850 | tracks/inch |
| Bit Density (max) | 23,800 | fci |

Controller 227, including printed circuit board 228 and circuitry 229 mounted on circuit board 228, provides control signals to spin motor 222 and actuator assembly 224, and provides data signals to and receives data signals from heads 226a–d. Header 230 provides all electrical connections between controller 227 and the environment between base 212 and cover 214. Header 230 comprises conductive pins 231 embedded in a plastic header 232 which is then potted in base 212. A reverse entry connector 237 mounted on the front side 228a of printed circuit board 228 receives pins 231; pins 231 pass through printed circuit board 228 to enter connector 237. Bracket 237 supports a flex circuit 233, including a reverse flex circuit loop 234, and connector 236 which provides electrical interconnections between flex circuit 233 and pins 231.

Figure 12:
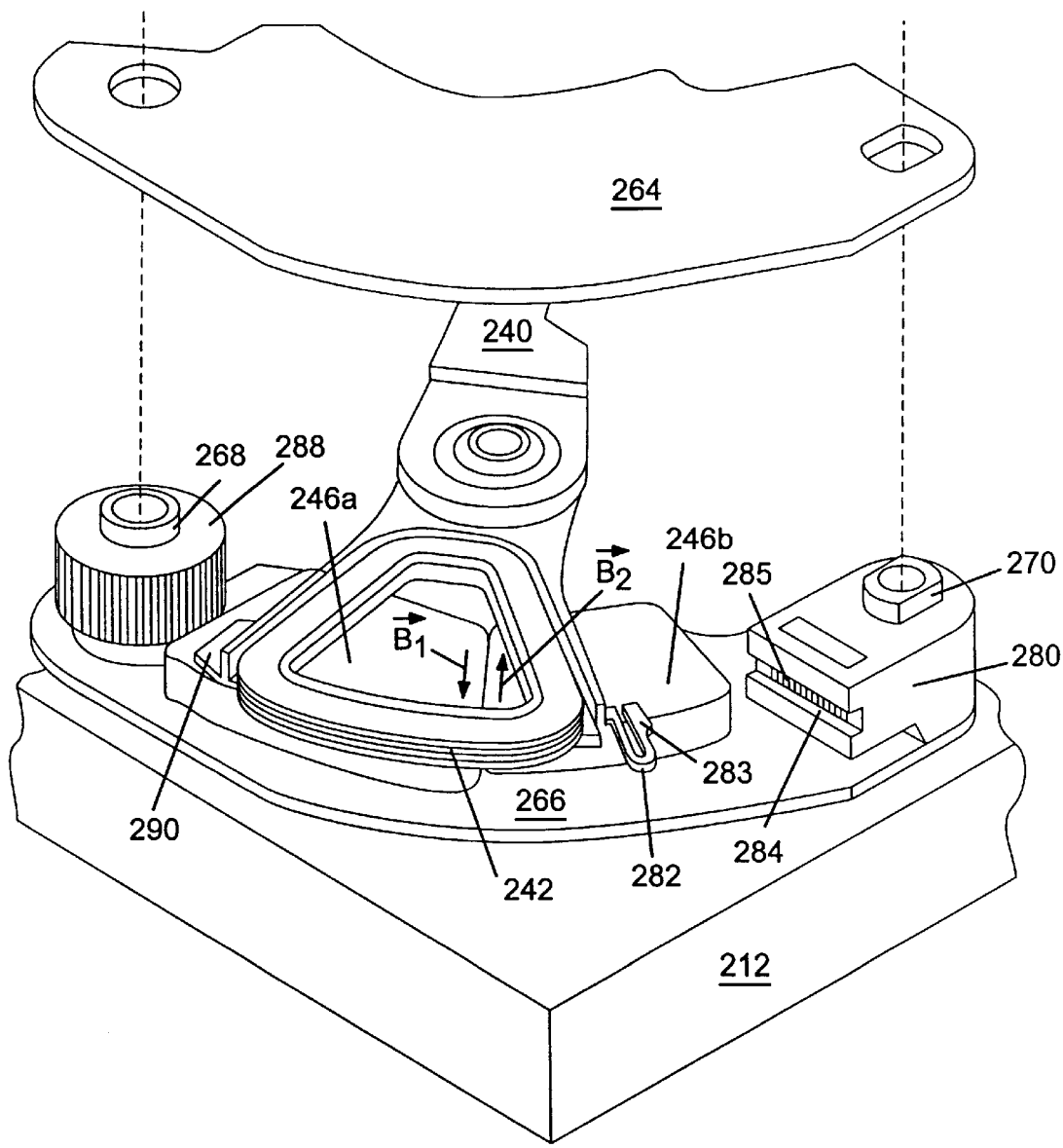

With reference to FIG. 12, actuator assembly 224 includes pivotable actuator arm 240 and an actuator motor. The actuator motor is a so-called voice coil motor comprising coil 242 (provided on actuator arm 240), first and second magnets 246a, 246b, top plate 264, bottom plate 226, first support post 268, and second support post 270. Top and bottom plates 264 and 266, in conjunction with first and second support posts 268, 270 create returns for the magnetic fields provided by first and second magnets 246a and 246b. The operation of the voice coil motor is described above with respect to the first embodiment.

The structure which enables disk drives 200 of the second embodiment of the present invention to include 2 disks, 220 and 221, lying in parallel planes within a one inch height from factor disk drive will be described with reference to FIGS. 8–10. In the first embodiment of the present invention the sloped profile of base 12 allowed the use of a fully shrouded power connector 58. In particular, power connector 58 was provided at the first end 10a of disk drive 10 where the sloped profile provided more room underneath base 12 and less room between base 12 and the top of cover 14. In the second embodiment, base 212 has first and second side rails 213a and 213b, and the mounting surface of base 212 is parallel to the plane defined by support points 215a–g. The space below base 212 is the same at both ends of drive 200; in the second embodiment a sloped profile is not utilized. In comparison with the first embodiment, the uniform height of raise 213a and 213b is the same as the height to raise 54a and 54b at the second end 10b of drive 10. Accordingly, the space between base 212 and cover 214 is increased at the end of drive 200 where disks 220 and 221 reside. This increased space between base 212 and cover 214, combined with the placement of motor 222 in well 223, allows two disks 220 and 221 to be provided in substantially parallel planes.

Printed circuit board 228 is mounted to base 212 by screws 254a–c, and an insulating sheet 255 is provided between printed circuit board 228 and base 212 to prevent short circuiting of the solder points appearing on the back side 228b of printed circuit board 226 which faces base 212. Printed circuit board 228 has an opening 253, and well 223 protrudes through opening 253.

The reduced height of rails 213a and 213b at the end of drive 200 where interface connector 256 and power connector 258 reside required the removal of part of the shrouding from power connector 258. Thus, pins 259 of electrical connector 258 are not protected by shroud 260 in the region between pins 259 and base 212. However, because the connector which attaches to pins 259 is itself insulated, there is no range of shorting pins 259 to base 212. A third connector 257, used for test purposes, is provided at the opposite end of drive 200 from connectors 256 and 258, as shown is FIG. 11.

Figure 11:
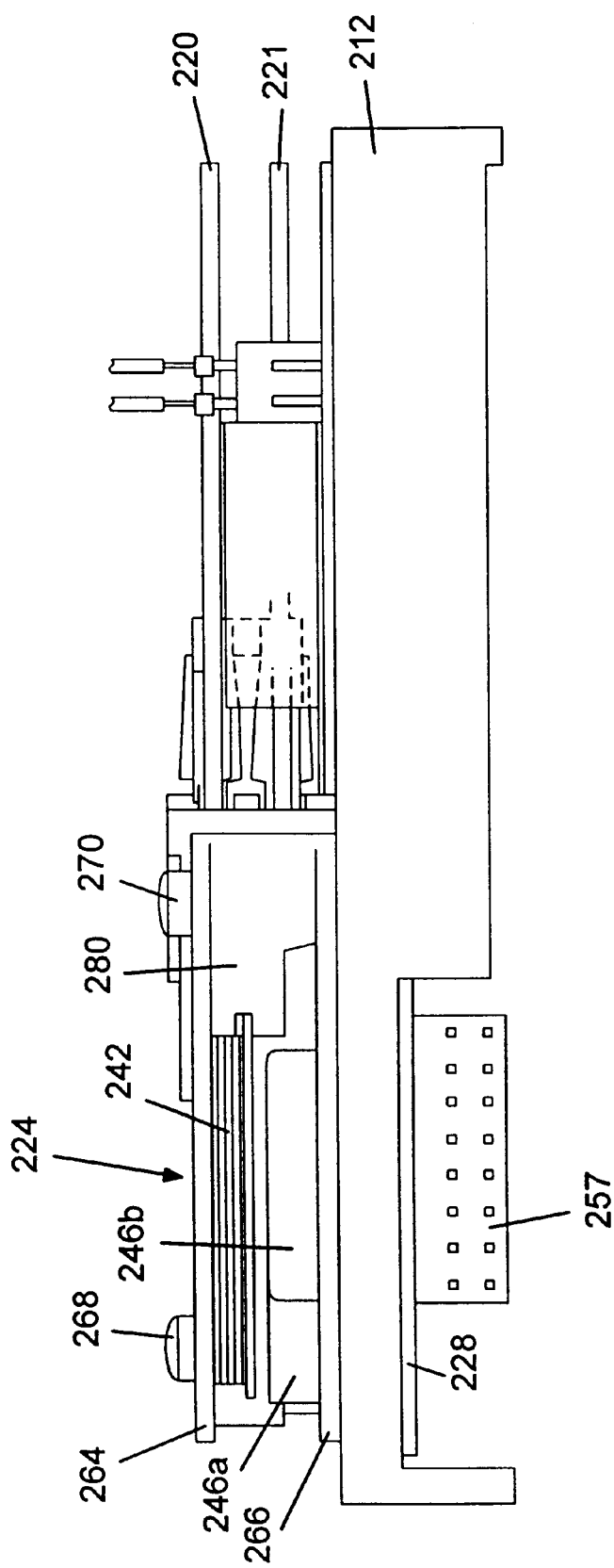

A latch mechanism for locking actuator arm 240 will be described with reference to FIGS. 11 and 12. The latch mechanism includes a magnet assembly 280 provided on second support post 270 and latch arm 282, including latch finger 283, mounted on actuator arm 240. Magnet assembly 280 has a slot 284 and contains the magnetic field provided by a magnet (not shown) so that the magnetic field affects latch finger 283 only when latch finger 283 enters slot 284.

A resilient element 285 provided in slot 284 of magnet assembly 288 functions as the inside diameter crash stop. A sleeve 288 provided on first support posts 268, combined with tab 290 on actuator arm 240 function as the outside diameter crash stop.

Table 3 specifies certain performance characteristics of disk drive 200.

TABLE 3

| Seek Times | |
|---|---|
| Track to Track | 8 msec |
| Average | sub-19 msec |
| Maximum | 35 msec |
| Average Latency 8.8 | msec |
| Rotation Speed (± .1%) | 3399 RPM |
| Controller Overhead | 1 msec |
| Data Transfer Rate To/From Media | 1.5 MByte/sec |
| Data Transfer Rate To/From Buffer | 4.0 MByte/sec |
| Interleave | 1-to-1 |
| Buffer size | 64K byte |

All seek times are determined for nominal d.c. input voltages. Average seek times are determined by dividing the total time required to seek between all possible ordered pair of track addresses by the total number of ordered pairs.

Table 4 specifies certain environmental characteristics of disk drive 200.

TABLE 4

| Temperature | |
|---|---|
| Operating | 5° to 55° |
| Non-operating | −40° C. to 60° C. |
| Thermal Gradient | 20° C. per hour maximum |
| Humidity | |
| Operating | 8% to 80% non-condensing |
| Non-operating | 8% to 80% non-condensing |
| Maximum Wet Bulb | 26° C. |
| Altitude (relative to sea level) | |
| Operating | −200 to 10,000 feet |
| Non-operating (max.) | 40,000 feet |

Table 5 specifies shock and vibration tolerances for disk drive 200. Shock is measured utilizing a ½ sine pulse, having a 11 msec duration, a vibration is measured utilizing a swept sine wave varying at 1 octave per minute.

TABLE 5

| Non-operating shock | 75 G's |
|---|---|
| Non-operating vibration | |
| 5–62 Hz | 0.020" (double amplitude) |
| 63–500 Hz | 4 G's (peak) |
| Operating shock | 5 G's (without non-recoverable errors) |
| Operating vibration | |
| 5–27 HZ | .025" (double amplitude) |
| 28–500 HZ | .5 G's (peak) (without non-recoverable errors) |

Third Embodiment

A disk drive 300 in accordance with the third embodiment of the present invention will be described with reference to FIGS. 13–24.

As shown in FIGS. 13–20, the construction of disk drive 300 includes a base 312 and a cover 314, both generally formed of aluminum. Gasket 316 provides a sealed, controlled environment substantially isolated from ambient atmospheric pressures between base 312 and cover 314. As will be discussed in further detail below, a unique, elastomeric and metal gasket provides improved sealing of the disk drive in accordance with the third embodiment. First and second disks 320, 321 are supported on base 312 and rotated by spin motor 322. Motor 322 is mounted in a well 323 in base 312, thereby allowing lower disk 321 to be as close as possible to the top surface of base 312.

Figure 13:
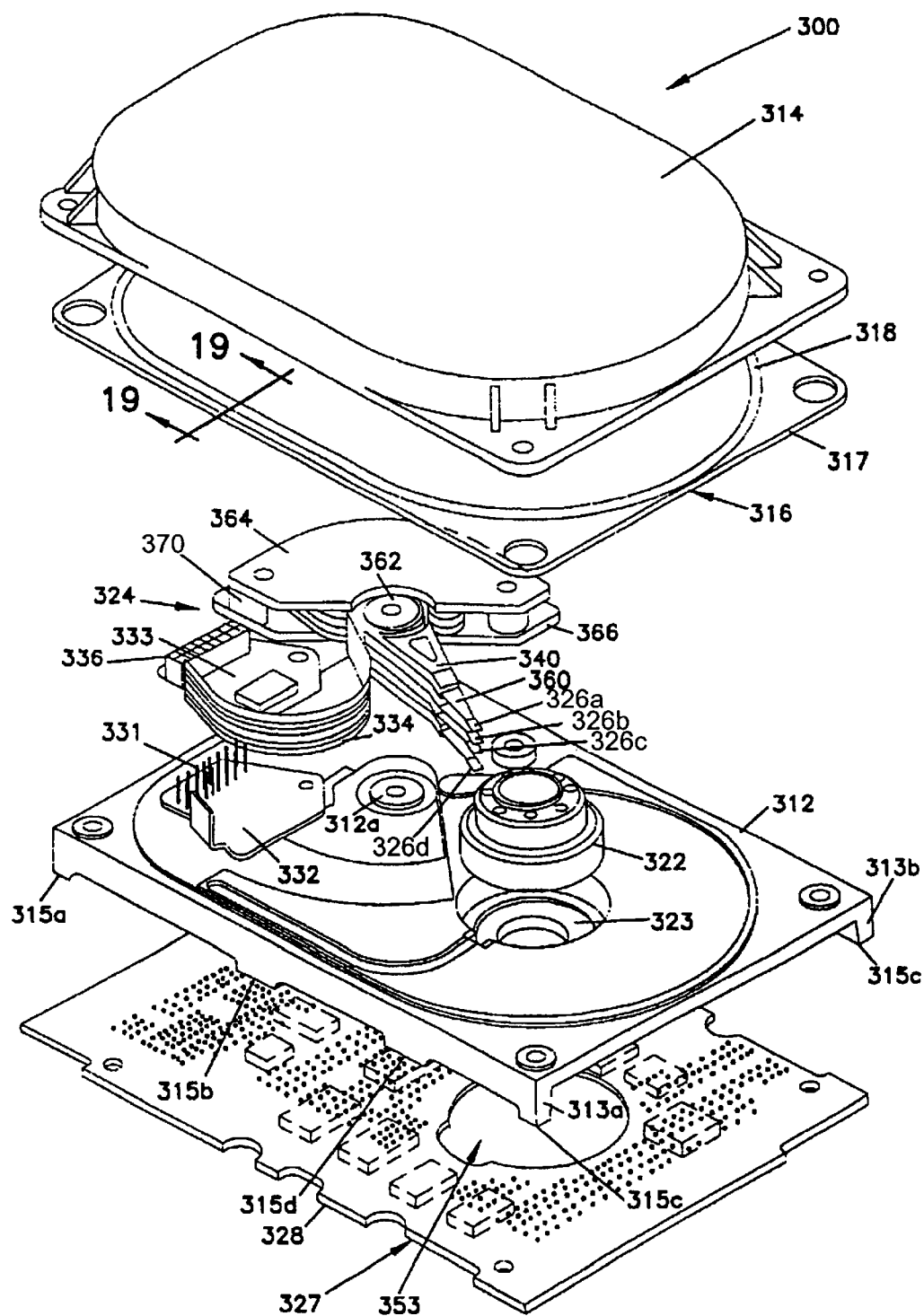

Gasket 316 is formed to have a unique elastomeric and metal structure which provides improved sealing characteristics for disk drive 300 and ease of assembly. Generally, hermetically sealed disk drives utilize gaskets formed entirely of an elastomeric material. As shown in FIGS. 13 and 19, gasket 36 includes a metal layer 317 sandwiched between two elastomeric layers $318_1$ and $318_2$. In one embodiment, layer 317 is formed of stainless steel and layers $318_1$ and $318_2$ are formed of burtyl rubber. The structure of gasket 316 provides easier assembly in the manufacture of drive 300 since the stiffness provided by the metal layer allows easier seating of the gasket structure on the base plate than drives using a purely elastomeric gasket. Gasket 316 further provides a seal for the hermetically sealed, controlled environment between cover 314 and base 312. In this regard, gasket 316 has a lateral strength superior to that purely elastomeric gaskets. The additional stiffness, yielded through use of a high modulus material, such as burtyl rubber, in conjunction with the stainless steel sandwiched layer, improves the driver's resistance to a phenomenon known as "blow out," which can cause a conventional elastomeric gasket of a hermetically sealed drive to deform with changes in external pressure relative to the pressure within hermetically sealed environment.

An actuator assembly 324 positions heads 326a–d with respect to disks 320 and 321; heads 326a and 326b read information from and write information to respective, opposed surfaces of disk 320, and heads 326c and 326d read information from and write information to respective, opposed surfaces of disk 321. Disks 320, 321 may comprise plated magnetic disks with an intensity of 1400 Oe. Table 6 below specifies certain characteristics of disks 320 and 321 and heads 326a–d. Heads 326a–326d may comprise thin film, air bearing heads capable of operating at a minimum flying height of 4.3 micro-inch, with a gap width of approximately 7.5 micron, a gap length of approximately 0.4 micron, with a head gram load of approximately 5 grams.

TABLE 6

| Number of Disks | 2 | |
|---|---|---|
| Number of Data Surfaces | 4 | |
| Number of Data Cylinders (Tracks per surface) | 2124 | cylinders |
| Sectors per Track | 50 | physical |
|  | 49 | accessible |
| Bytes per Sector | 668 | bytes |
| Data Bytes per Sector | 512 | bytes |
| Data Capacity per Data Surface (fomatted) | 53.3 | Mbytes |
| Total Data Capacity (formatted) | 213.2 | Mbytes |
| Disk Diameter | 95 | millimeters |
|  | 3.74 | inches |
| Data Track Band Width | 0.84 | inches |
| Track Density | 2496 | tracks/inch |
| Bit Density (max) | 30,452 | fci |

Controller 327, including printed circuit board 328 and the circuitry mounted thereon provides control signals to spin motor 322 and actuator assembly 324, and provides data signals to and receives data signals from heads 326a–d, actuator assembly 324 and spindle motor 322. Header 320 provides all electrical connections between controller 327 and the environment between base 312 and cover 314. Header 330 comprises conductive pins 331 embedded in a plastic header 335 which is then potted in base 212. Bracket 332 supports a flex circuit 333, including a reverse flex circuit loop 334, and connector 336 which provides electrical interconnections between flex circuit 333 and pins 331.

Controller 327 may incorporate the system described in the above co-pending application entitled MULTIPLE MICRO CONTROLLER HARD DISK ARCHITECTURE. The third embodiment of the present invention provides a substantial increase in storage capacity within the same physical form factor as the drives of the first and second embodiments by incorporating several different factors. Specifically, the read/write heads used in the present invention, while being of the conventional air-bearing design, utilize a so-called 70% slider, wherein the dimensions of the head and slider have been reduced by approximately 30% from the sliders utilized in the first and second embodiments of the disk drive. In addition, the head gap width has been reduced to approximately 7.5 micron, with a gap length of 0.4 micron. In addition, with an increase in the intensity of the storage media to a 1400 Oe plated disk, and an increase in track density to 2496 tracks per inch, the aforementioned controller architecture allows for an increase in the storage capacity of the disk drive to up to about 213 MBytes, using 49 user sectors and providing a data rate of 20 MBytes/second.

Printed circuit board 328 is mounted to base 312 by mounting screws (not shown), and an insulating sheet (not shown, similar to sheet 255) may be provided between printed circuit board 328 and base 312 to prevent short circuit of the solder points appearing on the back side 328b of printed circuit board 328 which faces base 312. Printed circuit board 328 has an opening 353, and well 323 protrudes through opening 353.

The disk drive of the third embodiment has a structure which is similar to disk drive 200 of the second embodiment 60 enable two (2) disks, 320 and 321, to lie in parallel planes within a one inch height, three and one-half inch form factor disk drive. In the first embodiment of the present invention the sloped profile of base 12 allowed the use of a fully shrouded power connector 58. In the third embodiment, as in the first embodiment, base 312 has first and second side rails 313a and 313b, and the mounting surface of base 312 is parallel to the plane defined by support points 315a–g. The space below base 312 is the same at both ends of drive 300; thus, in the third embodiment a sloped profile is not utilized. As with the second embodiment of the disk drive of the present invention, the placement of motor 322 in well 323, allows two disks 320 and 321 to be provided in substantially parallel planes.

Printed circuit board 328 may include an interface connector, power connector, and test connector similar to that utilized the second embodiment of the drive of the present invention.

Figure 20:
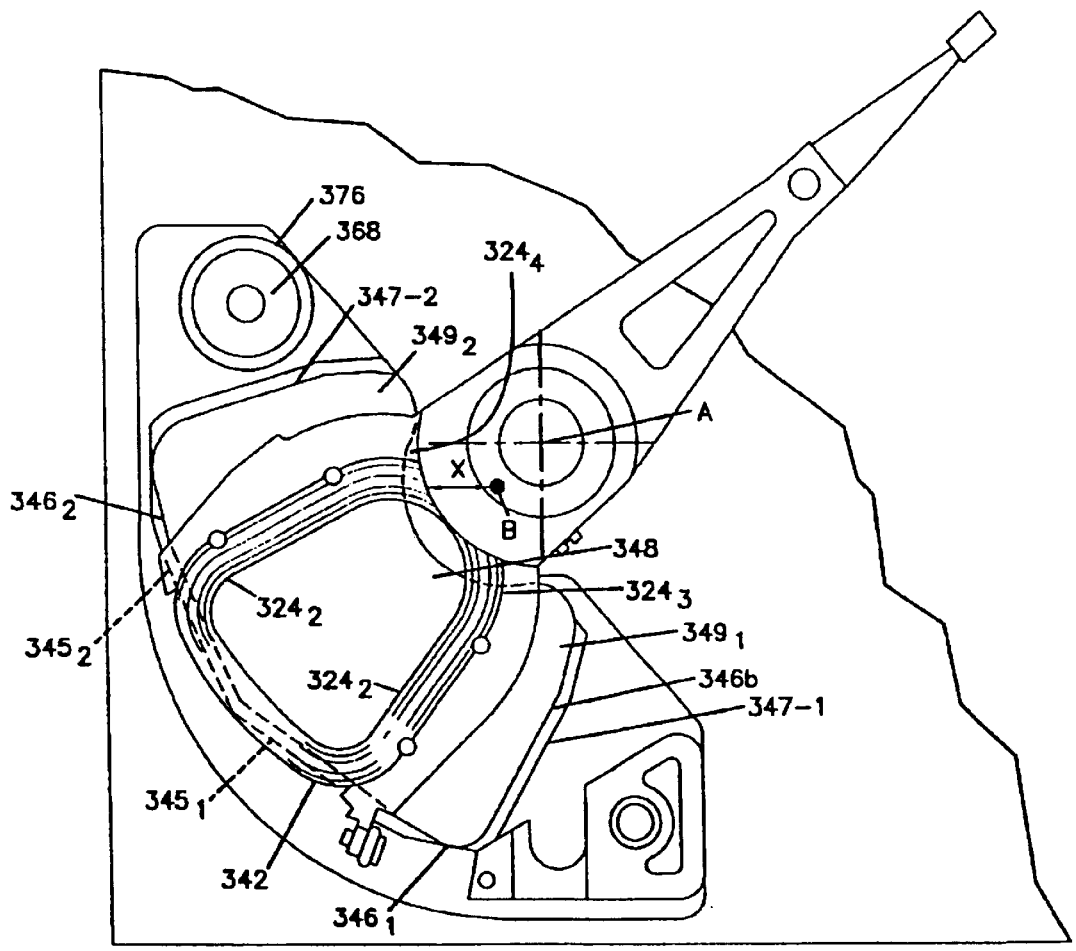
FIG. 20 is a plan view of the actuator assembly of the third embodiment of the present invention with the top plate and top magnet removed, detailing the relationship between the actuator coil and actuator magnet construction used therein.

The specific structure, operation, and features of actuator assembly 324 will be explained with reference to FIGS. 14–18 and 20. The function of the actuator assembly 324 is to position heads 326 with respect to the surfaces of disks 320, 321 by pivoting actuator arm assembly 340, and more specifically, to position the heads 326 over individual tracks on disks 320, 321. Heads 326 are supported on actuator arm 340 by load beams 360. A bearing cartridge 362, which is fixed to the base plate 312 at mounting region 312a, is inserted in actuator arm 340 to allow arm 340 to rotate about pivot point "A" (FIG. 20). Actuator arm 340 is attached to bearing cartridge 362 by a clip ring 363. As noted above, using clip ring 363 instead of epoxy allows the bearing cartridge 362 to be tested prior to assembly and cleaned independently of the actuator arm 340. Heads 326 may thus be positioned along an arcuate path at any individual data track between innermost data track 295 and outermost data track 296 by the voice coil motor as described below.

The force utilized to pivot arm assembly 340 is provided by a so-called voice coil motor comprising coil 342 (provided on actuator arms 340-1, 340-2), first and second magnets 346a, 346b, top plate 364, bottom plate 366, support post 368, and latch body 370. Actuator assembly 324 provides a unique coil and magnet design which improves the efficiency of the actuator by providing a relatively constant amount of torque on arm 340 throughout its rotational movement. Top and bottom plates 364 and 366, in conjunction with first support post 368 and latch body 370 create returns for the magnetic fields provided by first and second magnets 346a and 346b. (The general operation of the voice coil motor is described above with respect to the first and second embodiments.) It is important that there are no air gaps between support posts 368, latch body 370 and either the top or bottom plate 364, 366; any air gap would create a discontinuously in the return, greatly reducing the strength of the magnetic field.

First and second magnets 346a, 346b are bipolar, each having a first and second region $346_1$, $346_2$ with opposite poles attached to top plate 364 (e.g., the south pole of first magnet 364a and the north pole of second magnet 346b are attached to top plate 364) to provide first and second magnetic fields $\overline{B}_1$, $\overline{B}_2$ between respective ones of the first and second magnets 346a, 346b and bottom plate 366. First and second magnetic fields $\overline{B}_1$, $\overline{B}_2$ are encompassed in closed magnetic field loops provided by top plate 364, bottom plate 366, support post 368, and latch body 370.

Actuator coil 342 is positioned so that it carries a current in opposite directions in first and second magnetic fields $\overline{B}_1$ and $\overline{B}_2$. The strength of the magnetic field in this region between magnets 346a, 346b is directly related to the torque which the voice coil exerts on the actuator arm 340, and thus the rotational velocity of actuator 340 and the seek times for the drive.

The force on a current carrying wire in a magnetic field is proportional to the magnetic field intensity, and is expressed by the equation $\overline{F}=id\overline{l}\times\overline{B}$, where $\overline{F}$ is the force, i is the current, $\overline{l}$ is the length of the wire, and $\overline{B}$ is the magnetic field. Passing a current in opposite directions in actuator coil 342 provides respective forces $\overline{F}_1$ and $\overline{F}_2$ (FIG. 17); these forces $\overline{F}_1$ and $\overline{F}_2$ pivot actuator arm 340 in opposite directions about an axis passing through the center of bearing assembly 362.

Actuator arm 340 may be fabricated of magnesium, including all of the components attached thereto, is precisely balanced, i.e., equal amounts of weight are provided on either side of the pivot point so that the positioning of heads 326 is less susceptible to linear snock and vibration.

Figure 16:
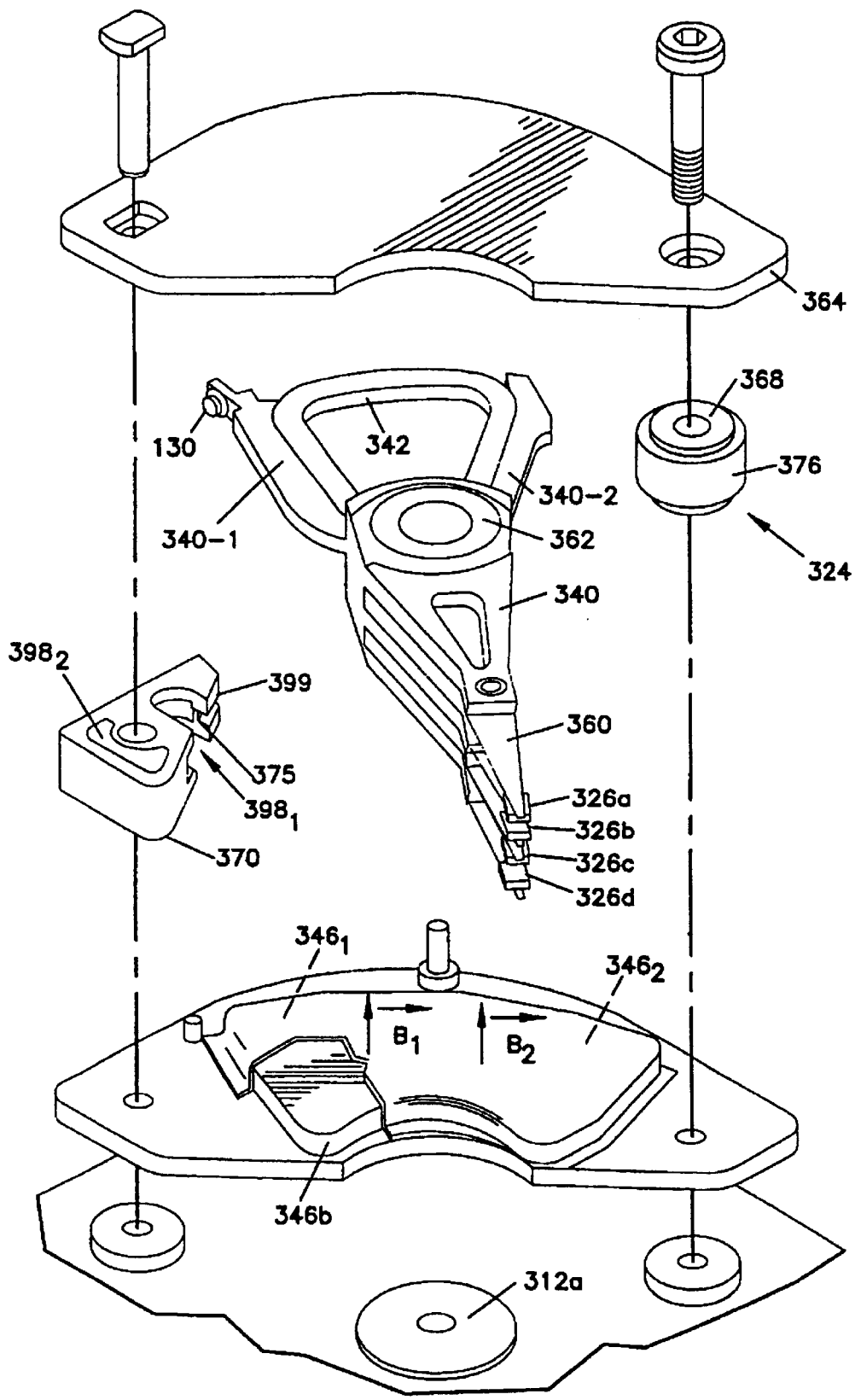
Figure 17:
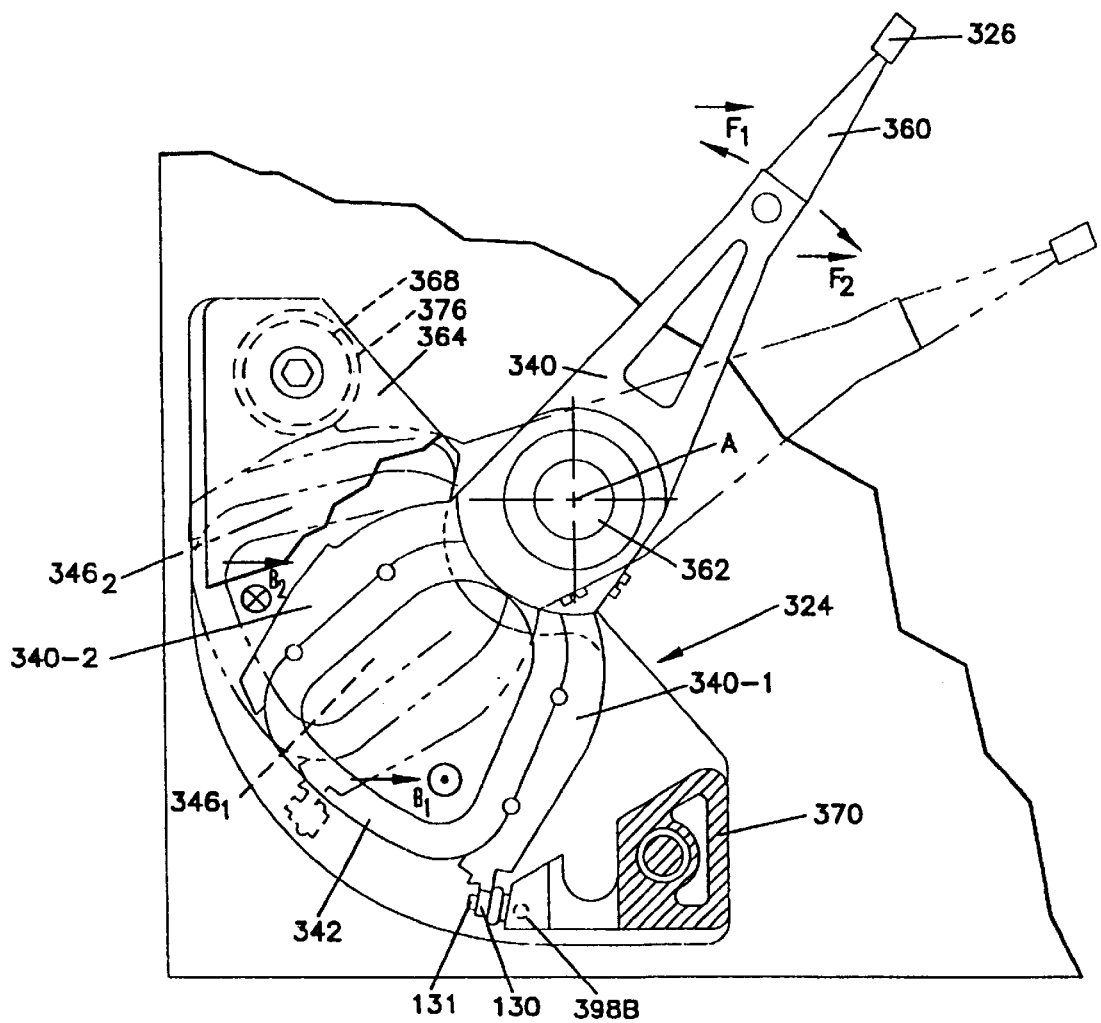
Figure 21:
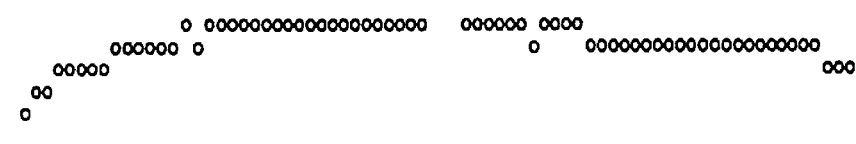
FIG. 21 is a graph representing the relative magnitude of the torque exerted on an actuator arm by the voice coil motor of the first embodiment of the disk drive of the present invention over the full stroke of the actuator's movement from the inner diameter to the outer diameter of the disk.
Figure 22:
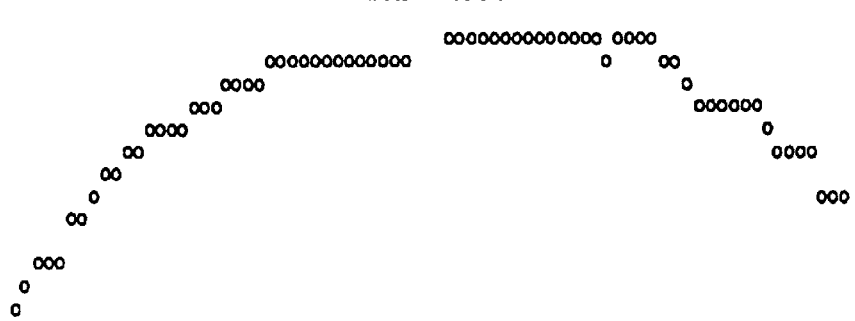
FIGS. 22–23 are graphs representing the relative magnitude of the torque exerted on an actuator arm by the voice coil motor of the second embodiment of the disk drive of the present invention over the full stroke of the actuator's movement.
Figure 23:
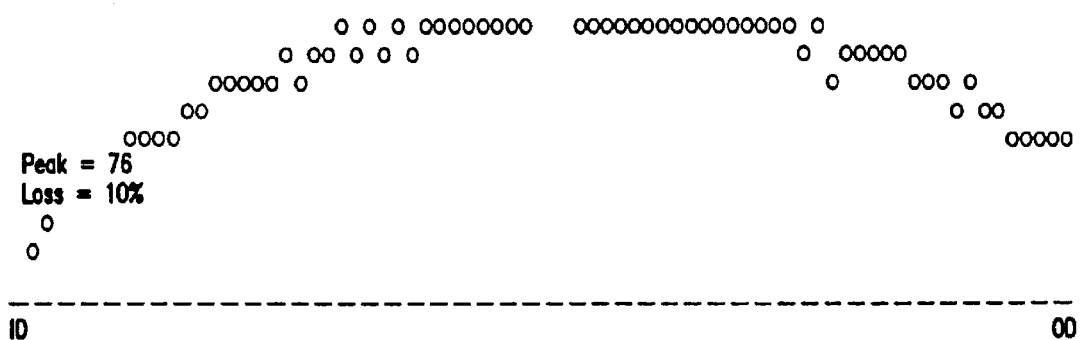

Testing of the voice coil motors of conventional disk drives has shown that the magnetic field strength at the peripheral portions of actuator magnets is less than the magnetic field strength at the central portion of actuator magnet. Presumably, this is because the direction of magnetic flux between plates 364, 366 near the central portion of magnets 346a, 346b is essentially vertical, as shown in FIG. 16 by magnetic field vectors $\overline{B}_1$ and $\overline{B}_2$. As one moves outward from the line of division between regions $346_1$ and $346_2$ toward the periphery of the magnet (sides 347-1 and 347-2), the direction of the magnetic flux tends to become non-perpendicular with respect to the surface of magnets 346a, 346b. This has the effect of reducing the torque exerted by the voice coil motor on the actuator arm 340 when the arm is moving toward the innermost track 295 or outermost track 296. FIGS. 21, 22, and 23 show that the torque generated by the voice coil motor in the first (FIG. 21) and second (FIGS. 22–23) embodiments of the present invention decreases as actuator arm 340 positions heads 326 at inside diameter track 295 and outside diameter track 296. FIG. 21 is a graph of the torque applied to actuator arm 40 of the disk drive of the first embodiment of the present invention upon acceleration of arm 40 in response to a seek command from controller 28. As shown in FIG. 21, the loss recorded at the inside and outside diameter position of heads 26 is approximately 6% for the drive tested. Experimental results on a number of similar drives a typical loss at the inside and outside diameters of approximately 10%.

FIGS. 22 and 23 are graphs showing the relationship between the torque applied on acceleration of the actuator arm 240 of the disk drive of the second embodiment of the present invention in relation to the position of heads 226 at the inside and outside diameter tracks of disk 220. As shown therein, the two drives tested show losses at the inside and outside diameters of the disk of approximately 12% and 10%, respectively.

To provide a greater efficiency for the actuator of the third embodiment of the present invention, coil 324 and magnets 346a, 346b have been designed to provide both a greater effective area of coil 324 in the presence of the magnetic field $\overline{B}_1$ and $\overline{b}_2$, and a greater magnetic field intensity at the peripheral edges of the magnets.

Figure 24:
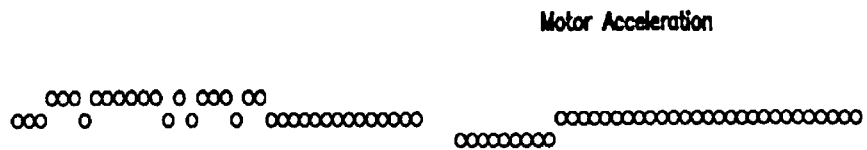
FIG. 24 is a graph representing the relative magnitude of the torque exerted on an actuator arm by the voice coil motor of the third embodiment of the disk drive of the present invention over the full stroke of the actuator's movement.

FIG. 20 details the relationship between coil 324 and actuator magnet 346b as such, top plate 364 has been removed. It should be generally understood that the following principles, described in conjunction with magnet 346b, apply equally to magnet 346a provided on top plate 364. In order to compensate for torque losses at the inner diameter and outer diameter, the surface area of magnet 346b is appreciably increased with respect to the actuator magnets shown in the first and second embodiments of the present invention. Specifically, magnet 346b includes a greater surface area at the respective ends 347-1 and 347-2 of the magnet, over which coil portions $324_1$ and $324_2$ are positioned when heads 326 are at inside diameter 295 or outside diameter 296 of disk 320. The curvature of magnet edge 348, positioned closest the axis of rotation of actuator 340, is extremely pronounced, and results in the formation of regions $349_1$ and $349_2$ between edges 347-1 and 347-2 of magnet 346b and the axis of rotation of actuator body 340. The arcuate shape of magnet edge 348 is such that it has a near tangential relationship with respect to edges $324_3$ and $324_4$ of coil 324, and is defined to have a constant radius "X" with respect to "B", adjacent magnet 346b. In one configuration, radius "X" is approximately 0.387 inch. Magnet 346b also includes an outer edge 345, comprising first and second edges $345_1$ and $345_2$, meeting, at an angle, at the division of regions $346_1$ and $346_2$ of magnet 346b. As will be noted from an examination of FIG. 12, only the linear, uncurved portions of coil 242 overlie magnets 246a and 246b in the second embodiment. In the third embodiment of the present invention, coil 324 has been modified so that more coil area is provided over the major surface of magnet 346. Specifically, in the disk drive of the second embodiment of the present invention, approximately 35% of the coil area is utilized; in the third embodiment, coil area utilization is increased to approximately 43%. Thus, a greater amount of coil area is provided in magnetic fields $\overline{B}_1$ and $\overline{B}_2$, therefore providing greater efficiency in the voice coil motor of the third embodiment of the present invention and greater torque on actuator arm 340. Specifically, it is estimated that, due to both the improvement in the shape of magnets 346a, 346b and the shape of coil 342, having a small curved area close to actuator pivot point "A", the usable area of the coil is increased in this embodiment to approximately 43%. Further, because of the increased field strength provided by the greater surface area of magnet 346b near magnet ends 347-1 and 347-2, the drop off associated with the acceleration torque in the first and second embodiments of the present invention is reduced. As shown in FIG. 24, the acceleration torque has a greater "linearity" than the acceleration torque shown in FIGS. 21–23. That is, the torque profile of the voice coil motor of the third embodiment is nearly linear between the inner diameter and the outer diameter, exhibiting less of an arcuate shape than the profiles depicted in FIGS. 21–23. Magnetic flux and torque loss associated with the positioning of the heads at the inner or outer diameters is markedly reduced, resulting in a total loss of torque of about 3% for the drive tested with respect to FIG. 24.

The actuator design of the third embodiment of the present invention results in an improvement of approximately 4.7% in access time.

Generally, the seek time specification for hard disk drives is determined in relation to the drive's minimal expected efficiency. That is, in conventional drives, the lowest actuator torque constant ($K_t$) for a given drive between the innermost track and the outermost track of the disk is used to generate the expected seek profiles for the drive. Losses occurring primarily at the peripheral edges of actuator magnets create longer seek times. The benefits of the higher torque magnitude, generated over the central areas of the magnet, is lost.

Actuator disk access is generally divided into three segments controlled by the control means: a full acceleration of the actuator toward the track; a controlled deceleration of the actuator to a point within a specified area near the track (typically ¼ track width); and a positioning loop, for accurately locating the head over the desired track, also known as "settling." The raw average access time is defined as comprising the acceleration and deceleration of the actuator. The effective improvement in average access time can be shown mathematically as follows. The raw average access time for a drive, such as that shown in FIGS. 13–20, is given by $$\tau = \left(1 + \frac{V_a}{V_d}\right)\sqrt{\frac{2\theta_s}{K_t}\frac{JR}{V_a}}$$

where
- $\theta_s$=the distance, in radians, of travel from start to finish for the actuator (typically ⅓ of a full stroke, 0.07 rad);
- J=the polar inertia of a moving actuator (23.0×10$^{-6}$ in-lbs$^2$);
- R=the resistance, in ohms, of the coil (25 Ω);
- $K_t$=the motor torque constant (typically 0.7 in-lb/amp);
- $V_a$=the voltage applied to accelerate the actuator (9.5 v); and
- $V_d$=the voltage applied to decelerate the actuator (5 v). For purposes of clarity, the above equation neglects the effects of coil inductance, back EMF and assumes a controlled deceleration.

Given the above values, the total computed access time is 10.09 ms. By improving the torque constant, e.g., the "linearity" of the magnetic field over the full stroke of the actuator arm, an improvement in access time for the drive will follow, as shown in the following analysis.

By holding all variables except $K_t$ constant, the torque equation is simplified to $$\tau = K_1\sqrt{\frac{K_2}{K_t}}$$

where $$K_1 = 1 + \frac{V_a}{V_d}$$

and $$K_2 = \frac{2\theta_s JR}{V_a},$$

we find $$\tau = K_1\sqrt{\frac{K_2}{K_t}}$$

$$= K_1\sqrt{K_2}\left(\frac{1}{\sqrt{K_t}}\right)$$

If $K = K_1\sqrt{K_2}$, then, $$\tau = K\left(\frac{1}{\sqrt{K_t}}\right).$$

If, then, the torque constant $K_t$ is increased by a factor of 10% so that $$\tau = K\left(\frac{1}{\sqrt{1.1K_t}}\right)$$

$$= K\left(\frac{1}{\sqrt{1.1}\sqrt{K_t}}\right)$$

$$= .953\left(\frac{1}{\sqrt{K_t}}\right)$$

Thus, for every 10% improvement in the torque constant, a 4.7% improvement in access time, τ, can be seen.

Hence, by increasing the total minimum torque constant by increasing surface area of the voice coil magnet and the area of the coil in the field generated by the voice coil magnets, the average seek times for the drive can likewise be decreased.

Crash stops are provided to limit the pivoting movement of actuator arm 340 so that heads 326 travel only between selected inside and outside diameters 295, 296 of disk 320. An outside diameter crash stop is provided by a sleeve 376 (FIGS. 16, 17, and 20) fitted on support post 0.368. When the pivoting motion of actuator arm 340 places heads 326 at the outside diameter 296 of disk 320 portion 242 of actuator arm 340-2 contacts outside diameter crash stop 376, thereby preventing further movement of the heads 326. An inside diameter crash stop is provided by the portion of the latch mechanism and is described below.

A latch mechanism for locking actuator arm 340 will be described with reference to FIGS. 14–20.

The latch mechanism of the third embodiment of the disk drive of the present invention utilizes the force of the voice coil actuator magnets 346a and 346b to provide the magnetic retentive force for the latching actuator 340.

As can be seen in FIGS. 14–20, a capture pin 130 formed of magnetically permeable material is provided in latch arm 340-1. Latch support structure 270 is designed so that the magnetic circuit formed by actuator magnets 346a and 346b provides a flux path through structure 270. Voids 398-1 through 398-4 are formed in structure 270 to channel the magnetic flux from magnets 346a and 346b to air gap 399. Specifically, air gap 399 has a width W of approximately 0.012 inches. Capture pin 130 is generally "T"-shaped, including portion 131 extending through a bore in actuator latch arm 340-1 and secured thereto by a snap ring (not shown.) The magnetic flux provided by magnets 346a and 346b and channeled through support structure 270 exhibits a fringing effect when the flux encounters gap 399. When actuator 340 is directed to position heads 326 over the landing zone at inner diameter 295, capture pin 130 is drawn into abutment with tabs 398a and 398b of structure 270. As pin 130 engages tabs 398a, 398b, the magnetic flux provided by magnets 346a and 346b passes through pin 130, making pin 130 part of the magnetic circuit formed by structure 270 and magnets 346a, 346b.

The latching force provided by the this latching mechanism is 50–60 inch grams. The amount of latching force may be adjusted by providing a shunt 375 (FIG. 16) across gap 399 to provide a flux path in parallel with the flux fringing about gap 399. Generally, there is no need for an additional latch magnet to provide the requisite magnetic latching and releasing forces for the actuator. Actuator assembly 324 can generate sufficient force to release actuator arm 340 from the latched position. The strength of the latching force is sufficient to retain the actuator in a captured position under non-operating shocks of up to 75 G's.

Table 8 specifies certain performance characteristics of disk drive 300.

TABLE 8

| Seek Times | |
| --- | --- |
| Track to Track | 3 msec |
| Average | 12 msec |
| Maximum | 25 msec |
| Rotation Speed (± .1%) | 4491 RPM |
| Data Transfer Rate To/From Media | 20 MByte/sec |
| Interleave | 1-to-1 |

TABLE 9

| Temperature | |
| --- | --- |
| Operating | 5° C. to 55° C. |
| Non-operating | −40° C. to 60° C. |
| Thermal Gradient | 20° C. per hour maximum |
| Humidity | |
| Operating | 8% to 80% non-condensing |
| Non-operating | 8% to 80% non-condensing |
| Maximum Wet Bulb | 26° C. |
| Altitude (relative to sea level) | |
| Operating | −200 to 10,000 feet |
| Non-operating (max.) | 40,000 feet |

Table 10 specifies shock and vibration tolerances for disk drive 200. Shock is measured utilizing a ½ sine pulse, having a 11 msec duration, and vibration is measured utilizing a swept sine wave varying at 1 octave per minute.

TABLE 10

| Non-operating shock | 75 G's |
| --- | --- |
| Non-operating vibration | |
| 63–500 Hz | 4 G's (peak) |
| Operating shock | 5 G's (without non-recoverable errors) |
| Operating vibration | |
| 28–500 HZ | .5 G's (peak) (without non-recoverable errors) |

The many features and advantages of the disk drive of the present invention will be apparent to those skilled in the art from the Description of the Preferred Embodiments. For example, those skilled in the art will appreciate that the structure of the disk drive of the present invention as described herein can be scaled for use with disk drives having disks with smaller and larger than 3 ½ inches. Thus, the following claims are intended to cover all modifications and equivalents falling within the scope of the invention.

What is claimed is:

1. A hard disc drive assembly having a base plate, one or more hard discs rotatably mounted on the base plate for rotation about a spin axis, and an actuator assembly rotatably mounted adjacent each disc positioning a plurality of read/write heads over selectable radial positions on each disc, the drive assembly comprising:

a boss on the base plate;

an actuator arm pivotally supported from the base plate for rotation about an axis parallel to the spin axis, the arm carrying the heads at one end thereof and having a generally flat voice coil mounted at an opposite end thereof, the voice coil being wound about an axis parallel to the spin axis;

an assembled unit including a voice coil magnet assembly comprising a bottom magnetic return plate having a generally flat upper surface lying in a plane normal to the spin axis, a top magnetic return plate spaced above the bottom magnetic return plate having a generally flat underside, and a pair of upper magnets mounted to the underside of the top return plate, each magnet having a generally flat plate shape, one of the magnets generating a magnetic field passing through the voice coil between the return plates in a first direction parallel to the spin axis and the other of the magnets generating a magnetic field passing through the voice coil in a second direction opposite to the first direction parallel to the spin axis, wherein the assembled unit is rotatably attached to the boss to sandwich the voice coil between the top return plate and the bottom return plate, wherein the top magnetic return plate and the bottom magnetic return plate are fastened together in the assembled unit prior to attachment of the assembled unit to the boss.

2. The hard disc drive assembly according to claim 1 further comprising a pair of lower magnets, each magnet having a generally flat plate shape, and each mounted to the upper side of the bottom return plate in a side by side relation beneath the upper magnets and sandwiching the voice coil between the upper and lower magnets.

3. The hard disc drive assembly according to claim 1 wherein the upper magnets are spaced apart by a gap.

4. The hard disc drive assembly according to claim 1 wherein the upper magnets are butted together.

5. The hard disc drive assembly according to claim 1 wherein the base plate has a substantially planar corner region adjacent to the boss that allows the assembled unit to be rotated about the boss to sandwich the voice coil between the top return plate and bottom return plate.

6. The hard disc drive assembly according to claim 1 wherein the assembled unit has a proximal end rotatably attached to the boss and a distal end, and further comprising
   a fastener attaching the distal end of the assembled unit to the base plate preventing rotation of the assembled unit about the boss.

7. A method for assembling a disc drive having a base plate and an actuator assembly including a voice coil; a voice coil magnet assembly comprising a bottom magnetic return plate having a generally flat upper surface lying in a plane normal to a disc spin axis, a top magnetic return plate spaced above the bottom magnetic return plate having a generally flat underside, and at least one pair of magnets mounted to at least one of the underside of the top return plate and/or an upper side of the bottom return plate, one of the magnets adapted to generate a magnetic field passing through the voice coil between the return plates in a first direction parallel to the spin axis and the other of the magnets adapted to generate a magnetic field passing through the voice coil in a second direction opposite to the first direction parallel to the spin axis, the method comprising:
   rotatably mounting a voice coil magnet assembly to an attachment point on the base plate, wherein the voice coil magnet assembly is pre-assembled prior to mounting the voice coil magnet assembly to the attachment point on the base plate; and
   rotating the voice coil magnet assembly about the attachment point to sandwich the voice coil between the top return plate and the bottom return plate.

8. The method of claim 7 further comprising:
   fastening the voice coil magnet assembly to another attachment point on the base plate to prevent rotation of the voice coil magnet assembly about the attachment point when the voice coil magnet assembly sandwiches the voice coil between the top return plate and the bottom return plate.

9. The method of claim 7 wherein the attachment point is a raised threaded boss projection from the base plate on an axis parallel with the spin axis.

10. A hard disc drive assembly having a base plate, a hard disc rotatably mounted on the base plate for rotation about a spin axis, and an actuator assembly having a voice coil and being rotatably mounted adjacent to the disc so as to position a read/write head over a selectable radial position on the disc, the hard disc drive assembly comprising:
    a boss on the base plate having an axis substantially parallel to the spin axis;
    an assembled voice coil magnet unit comprising a bottom magnetic return plate having a generally flat upper surface lying in a plane normal to the spin axis, a top magnetic return plate having a generally flat lower surface spaced above and parallel to the upper surface of the bottom return plate, and a pair of upper magnets mounted to one of the top return plate and the bottom return plate, each magnet having a generally flat plate shape, one of the magnets generating a magnetic field passing between the return plates in a first direction parallel to the spin axis and the other of the magnets generating a magnetic field passing between the return plates in a second direction opposite to the first direction parallel to the spin axis, each of the top magnetic return plate and the bottom magnetic return plate including a proximal end and a distal end, the proximal end of each return plate having a proximal end aperture substantially aligned with the axis of the boss, wherein the top magnetic return plate and the bottom magnetic return plate are fastened together in the assembled unit prior to attachment of the assembled unit to the boss whereby the assembled unit is rotatably attached to the boss to sandwich the voice coil between the top return plate and the bottom return plate.

11. The hard disc drive assembly of claim 10 wherein the distal end of each return plate has a distal end aperture substantially aligned with a distal end hole in the base plate.

12. The hard disc drive assembly of claim 11 further comprising:
    a proximal end fastener inserted through the proximal end aperture of each return plate rotatably attaching the assembled voice coil magnet unit to the boss; and
    a distal end fastener inserted through the distal end aperture of each return plate into the distal end hole in the base plate so as to prevent the assembled voice call magnet unit from rotating about the boss.

13. A hard disc drive assembly having a base plate, a hard disc rotatably mounted on the base plate for rotation about a spin axis, and an actuator assembly having a voice coil and being rotatably mounted adjacent to the disc so as to position a read/write head over a selectable radial position on the disc, the hard disc drive assembly comprising:
    a boss on the base plate having an axis substantially parallel to the spin axis;
    an assembled voice coil magnetic unit comprising a bottom magnetic return plate having a generally flat upper surface lying in a plane normal to the spin axis, a top magnetic return plate having a generally flat lower surface spaced above and parallel to the upper surface of the bottom return plate, and a pair of magnets mounted to one of the top return plate and the bottom return plate, each magnet having a generally flat plate shape, one of the magnets generating a magnetic field passing between the return plates in a first direction parallel to the spin axis and the other of the magnets generating a magnetic field passing between the return plates in a second direction opposite to the first direction parallel to the spin axis, each of the top magnetic return plate and the bottom magnetic return plate including a proximal end and a distal end, the proximal end of at least one of the return plates having a proximal end aperture substantially aligned with the axis of the boss such that the assembled voice coil magnetic unit is rotatably mounted to the boss, wherein the top magnetic return plate and the bottom magnetic return plate are fastened together in the assembled unit prior to mounting the assembled unit to the boss whereby the assembled unit is rotatably attached to the boss to sandwich the voice coil between the top return plate and the bottom return plate.

14. The hard disc drive assembly of claim 13 wherein the distal end of at least one of the return plates has a distal end aperture substantially aligned with a distal end hole in the base plate.

15. The hard disc drive assembly of claim 14 further comprising:
    a proximal end fastener inserted through the proximal end aperture of the return plate rotatably attaching the assembled voice coil magnet unit to the boss; and
    a distal end fastener inserted through the distal end aperture of the return plate into the distal end hole in the base plate so as to prevent the assembled voice coil magnetic unit from rotating about the boss, wherein both the top return plate and bottom return plate are attached to the base plate by the proximal end fastener and the distal end fastener.

16. A disc drive comprising:

a base plate;

an actuator assembly including a voice coil and being rotatably fastened to the base plate;

a boss on the base plate adjacent to the actuator assembly; and a pre-assembled voice coil magnet assembly rotatably attached to the base plate about the boss, the voice coil magnet assembly comprising an upper magnetic return plate having a lower flat surface, a lower magnetic return plate having an upper flat surface spaced from and parallel to the lower surface of the upper magnetic return plate, and a pair of flat magnets fastened to one of the lower and upper surfaces in side by side relation fastening the return plates together in the pre-assembled voice coil magnet assembly prior to attachment of the pre-assembled voice coil magnet assembly to the base plate whereby the pre-assembled voice coil magnet assembly is rotatably attached to the boss to sandwich the voice coil between the top return plate and the bottom return plate.

17. A method for assembling a disc drive having a base plate and an actuator assembly including a voice coil, wherein the actuator assembly is rotatably attached to the base plate, and method comprising:

pre-assembling a voice coil magnet assembly into an assembled unit including a top return plate, a bottom return plate, and an upper magnet affixed to the top return plate;

rotatably mounting the assembled unit to an attachment point on the base plate, responsive to the pre-assembly operation; and rotating the assembled unit about the attachment point to sandwich the voice coil between the top return plate and the bottom return plate of the voice coil magnet assembly.

* * * * *

UNITED STATES PATENT AND TRADEMARK OFFICE
CERTIFICATE OF CORRECTION

PATENT NO. : 6,429,999 B1
DATED : August 6, 2002
INVENTOR(S) : Wallis A. Dague and Frederick Mark Stefansky It is certified that error appears in the above-identified patent and that said Letters Patent is hereby corrected as shown below:

Column 9,
Line 53, "52" should read -- 32 --.

Column 11,
Line 43, "95" should read -- 96 --.

Column 13,
Line 11, "226" should read -- 266 --.

Column 14,
Line 14, Formatting

"Average Latency 8.8        msec"
should be
-- Average Latency           8.8 msec --

Column 14,
Line 39, "Altitude (relative to sea level)" should read -- Altitude (relative to sea level) --.

Column 15,
Line 16, "36" should read -- 316 --.

Column 16,
Line 2, "320" should read -- 330 --.

Column 18,
Line 32, "$b_2$" should read -- $B_2$ --.

Column 20,
Line 53, "0.368" should read -- 368 --.

UNITED STATES PATENT AND TRADEMARK OFFICE
CERTIFICATE OF CORRECTION

PATENT NO. : 6,429,999 B1
DATED : August 6, 2002
INVENTOR(S) : Wallis A. Dague and Frederick Mark Stefansky It is certified that error appears in the above-identified patent and that said Letters Patent is hereby corrected as shown below:

Column 21,
Line 49, insert above Table 9: -- Table 9 specifies certain environmental characteristics of disc drive 300 --.

Column 24,
Line 64, "magnet" should read -- magnetic --.

Column 26,
Line 8, delete the word "and" after base plate, and insert the word -- the --.

Signed and Sealed this

Eleventh Day of March, 2003

JAMES E. ROGAN
*Director of the United States Patent and Trademark Office*